US012684335B2

(12) United States Patent
Balasubramanian et al.

(10) Patent No.: US 12,684,335 B2
(45) Date of Patent: Jul. 14, 2026

(54) CONCURRENT SIDELINK AND DOWNLINK RECEPTION FOR MULTI-TRANSMIT RECEIVE POINT USER EQUIPMENT

(71) Applicant: QUALCOMM Incorporated, San Diego, CA (US)

(72) Inventors: Anantharaman Balasubramanian, San Diego, CA (US); Kapil Gulati, Belle Mead, NJ (US); Navid Abedini, Basking Ridge, NJ (US); Shuanshuan Wu, San Diego, CA (US); Sourjya Dutta, San Diego, CA (US); Junyi Li, Fairless Hills, PA (US); Hui Guo, Beijing (CN)

( * ) Notice: Subject to any disclaimer, the term of this patent is extended or adjusted under 35 U.S.C. 154(b) by 243 days.

(21) Appl. No.: 18/546,908

(22) PCT Filed: Apr. 25, 2021

(86) PCT No.: PCT/CN2021/089626

§ 371 (c)(1),
(2) Date: Aug. 17, 2023

(87) PCT Pub. No.: WO2022/226690

PCT Pub. Date: Nov. 3, 2022

(65) Prior Publication Data

US 2024/0137754 A1    Apr. 25, 2024
US 2024/0236652 A9    Jul. 11, 2024

(51) Int. Cl.

| | |
|---|---|
| *H04W 8/22* | (2009.01) |
| *H04B 17/318* | (2015.01) |
| *H04W 16/28* | (2009.01) |
| *H04W 92/18* | (2009.01) |

(52) U.S. Cl.
CPC ............ *H04W 8/22* (2013.01); *H04B 17/328* (2023.05); *H04W 16/28* (2013.01); *H04W 92/18* (2013.01)

(58) Field of Classification Search
CPC ....................................................... H04W 8/22
See application file for complete search history.

(56) References Cited

U.S. PATENT DOCUMENTS

| | | | |
|---|---|---|---|
| 12,526,666 B2 * | 1/2026 | Ren ........................ | H04W 24/08 |
| 2018/0205427 A1 * | 7/2018 | Ghosh ................. | H04B 17/318 |
| 2020/0022000 A1 | 1/2020 | Venugopal et al. | |

(Continued)

OTHER PUBLICATIONS

International Search Report and Written Opinion—PCT/CN2021/089626—ISA/EPO—Nov. 29, 2021.

(Continued)

*Primary Examiner* — Abdeltif Ajid

(57) ABSTRACT

Various aspects of the present disclosure generally relate to wireless communication. In some aspects, a user equipment (UE) may transmit, to a base station, information related to a concurrent reception capability using different receive beams. The UE may receive, from the base station, information indicating one or more slots in which concurrent sidelink and downlink reception is enabled based at least in part on the information related to the concurrent reception capability. The UE may receive, in the one or more slots in which concurrent sidelink and downlink reception is enabled, a downlink transmission from the base station using a first receive beam and a sidelink transmission from a peer UE using a second receive beam. Numerous other aspects are described.

30 Claims, 11 Drawing Sheets

700 ——▸

710 — Transmit, to a base station, information related to a concurrent reception capability using different receive beams 720 — Receive, from the base station, information indicating one or more slots in which concurrent sidelink and downlink reception is enabled based at least in part on the information related to the concurrent reception capability 730 — Receive, in the one or more slots in which concurrent sidelink and downlink reception is enabled, a downlink transmission from the base station using a first receive beam and a sidelink transmission from a peer UE using a second receive beam

(56)　　　　　　References Cited

U.S. PATENT DOCUMENTS

| 2020/0092685 | A1* | 3/2020 | Fehrenbach | ......... | H04W 72/23 |
| 2020/0145867 | A1 | 5/2020 | Tseng et al. | | |
| 2021/0037549 | A1* | 2/2021 | Akkarakaran | ......... | H04W 4/00 |
| 2021/0100059 | A1 | 4/2021 | Xu et al. | | |
| 2021/0112553 | A1 | 4/2021 | Hosseini et al. | | |
| 2021/0400692 | A1* | 12/2021 | Balasubramanian | ...................... H04L 61/2517 | |
| 2022/0030580 | A1* | 1/2022 | Lee | ....................... | H04W 72/20 |
| 2022/0346038 | A1* | 10/2022 | Miao | .................. | H04W 52/383 |
| 2024/0098657 | A1* | 3/2024 | Wu | .................... | H04W 52/383 |
| 2024/0306229 | A1* | 9/2024 | Chang | .................. | H04W 76/14 |

OTHER PUBLICATIONS

Partial International Search Report—PCT/CN2021/089626—ISA/ EPO—Oct. 7, 2021.

\* cited by examiner

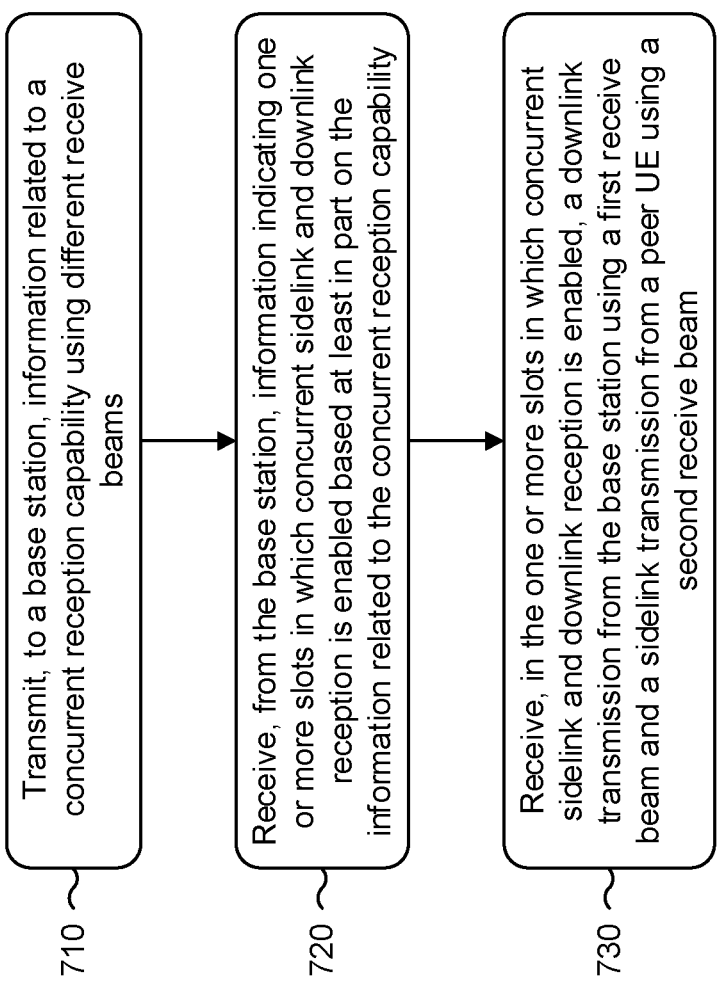

710 — Transmit, to a base station, information related to a concurrent reception capability using different receive beams 720 — Receive, from the base station, information indicating one or more slots in which concurrent sidelink and downlink reception is enabled based at least in part on the information related to the concurrent reception capability 730 — Receive, in the one or more slots in which concurrent sidelink and downlink reception is enabled, a downlink transmission from the base station using a first receive beam and a sidelink transmission from a peer UE using a second receive beam

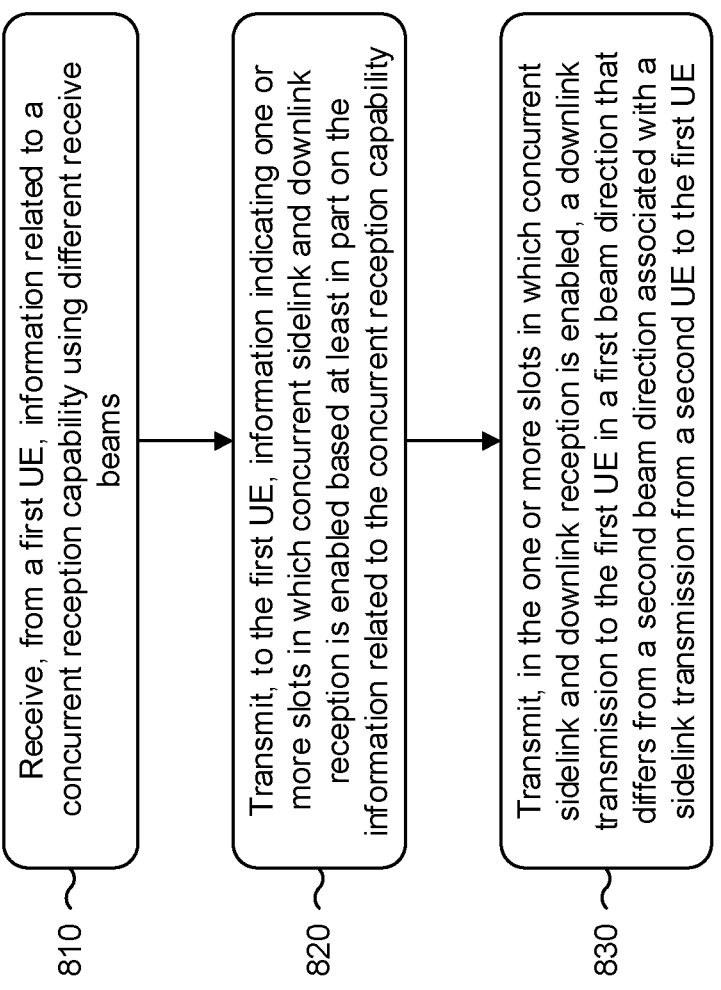

810 — Receive, from a first UE, information related to a concurrent reception capability using different receive beams 820 — Transmit, to the first UE, information indicating one or more slots in which concurrent sidelink and downlink reception is enabled based at least in part on the information related to the concurrent reception capability 830 — Transmit, in the one or more slots in which concurrent sidelink and downlink reception is enabled, a downlink transmission to the first UE in a first beam direction that differs from a second beam direction associated with a sidelink transmission from a second UE to the first UE

CONCURRENT SIDELINK AND DOWNLINK RECEPTION FOR MULTI-TRANSMIT RECEIVE POINT USER EQUIPMENT

CROSS-REFERENCE TO RELATED APPLICATION

This application is a 371 national stage of Patent Cooperation Treaty (PCT) Application No. PCT/CN2021/089626 filed on Apr. 25, 2021, entitled "CONCURRENT SIDELINK AND DOWNLINK RECEPTION FOR MULTITRANSMIT RECEIVE POINT USER EQUIPMENT." which is hereby expressly incorporated by reference herein.

FIELD OF THE DISCLOSURE

Aspects of the present disclosure generally relate to wireless communication and to techniques and apparatuses for concurrent sidelink and downlink reception for a multi-transmit receive point (mTRP) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, information related to a concurrent reception capability using different receive beams; receiving, from the base station, information indicating one or more slots in which concurrent sidelink and downlink reception is enabled based at least in part on the information related to the concurrent reception capability; and receiving, in the one or more slots in which concurrent sidelink and downlink reception is enabled, a downlink transmission from the base station using a first receive beam and a sidelink transmission from a peer UE using a second receive beam.

In some aspects, a method of wireless communication performed by a base station includes receiving, from a first UE, information related to a concurrent reception capability using different receive beams; transmitting, to the first UE, information indicating one or more slots in which concurrent sidelink and downlink reception is enabled based at least in part on the information related to the concurrent reception capability; and transmitting, in the one or more slots in which concurrent sidelink and downlink reception is enabled, a downlink transmission to the first UE in a first beam direction that differs from a second beam direction associated with a sidelink transmission from a second UE to the first UE.

In some aspects, a UE for wireless communication includes a memory; and one or more processors, coupled to the memory, configured to: transmit, to a base station, information related to a concurrent reception capability using different receive beams; receive, from the base station, information indicating one or more slots in which concurrent sidelink and downlink reception is enabled based at least in part on the information related to the concurrent reception capability; and receive, in the one or more slots in which concurrent sidelink and downlink reception is enabled, a downlink transmission from the base station using a first receive beam and a sidelink transmission from a peer UE using a second receive beam.

In some aspects, a base station for wireless communication includes a memory; and one or more processors, coupled to the memory, configured to: receive, from a first UE, information related to a concurrent reception capability using different receive beams; transmit, to the first UE, information indicating one or more slots in which concurrent sidelink and downlink reception is enabled based at least in part on the information related to the concurrent reception capability; and transmit, in the one or more slots in which concurrent sidelink and downlink reception is enabled, a downlink transmission to the first UE in a first beam direction that differs from a second beam direction associated with a sidelink transmission from a second UE to the first UE.

In some aspects, a non-transitory computer-readable medium storing a set of instructions for wireless communication includes one or more instructions that, when executed by one or more processors of a UE, cause the UE to: transmit, to a base station, information related to a concurrent reception capability using different receive beams; receive, from the base station, information indicating one or more slots in which concurrent sidelink and downlink reception is enabled based at least in part on the information related to the concurrent reception capability; and receive, in the one or more slots in which concurrent sidelink and downlink reception is enabled based at least in part on the information related to the concurrent reception capability; and receive, in the one or more slots in which concurrent sidelink and downlink reception is enabled, a downlink transmission from the base station using a first receive beam and a sidelink transmission from a peer UE using a second receive beam.

In some aspects, a non-transitory computer-readable medium storing a set of instructions for wireless communication includes one or more instructions that, when executed by one or more processors of a base station, cause the base station to: receive, from a first UE, information related to a concurrent reception capability using different receive beams; transmit, to the first UE, information indicating one or more slots in which concurrent sidelink and downlink reception is enabled based at least in part on the information related to the concurrent reception capability; and transmit, in the one or more slots in which concurrent sidelink and downlink reception is enabled, a downlink transmission to the first UE in a first beam direction that differs from a second beam direction associated with a sidelink transmission from a second UE to the first UE.

In some aspects, an apparatus for wireless communication includes means for transmitting, to a base station, information related to a concurrent reception capability using different receive beams; means for receiving, from the base station, information indicating one or more slots in which concurrent sidelink and downlink reception is enabled based at least in part on the information related to the concurrent reception capability; and means for receiving, in the one or more slots in which concurrent sidelink and downlink reception is enabled, a downlink transmission from the base station using a first receive beam and a sidelink transmission from a peer UE using a second receive beam.

In some aspects, an apparatus for wireless communication includes means for receiving, from a first UE, information related to a concurrent reception capability using different receive beams; means for transmitting, to the first UE, information indicating one or more slots in which concurrent sidelink and downlink reception is enabled based at least in part on the information related to the concurrent reception capability; and means for transmitting, in the one or more slots in which concurrent sidelink and downlink reception is enabled, a downlink transmission to the first UE in a first beam direction that differs from a second beam direction associated with a sidelink transmission from a second UE to the first UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes associated with concurrent sidelink and downlink reception for an mTRP UE, in accordance with the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
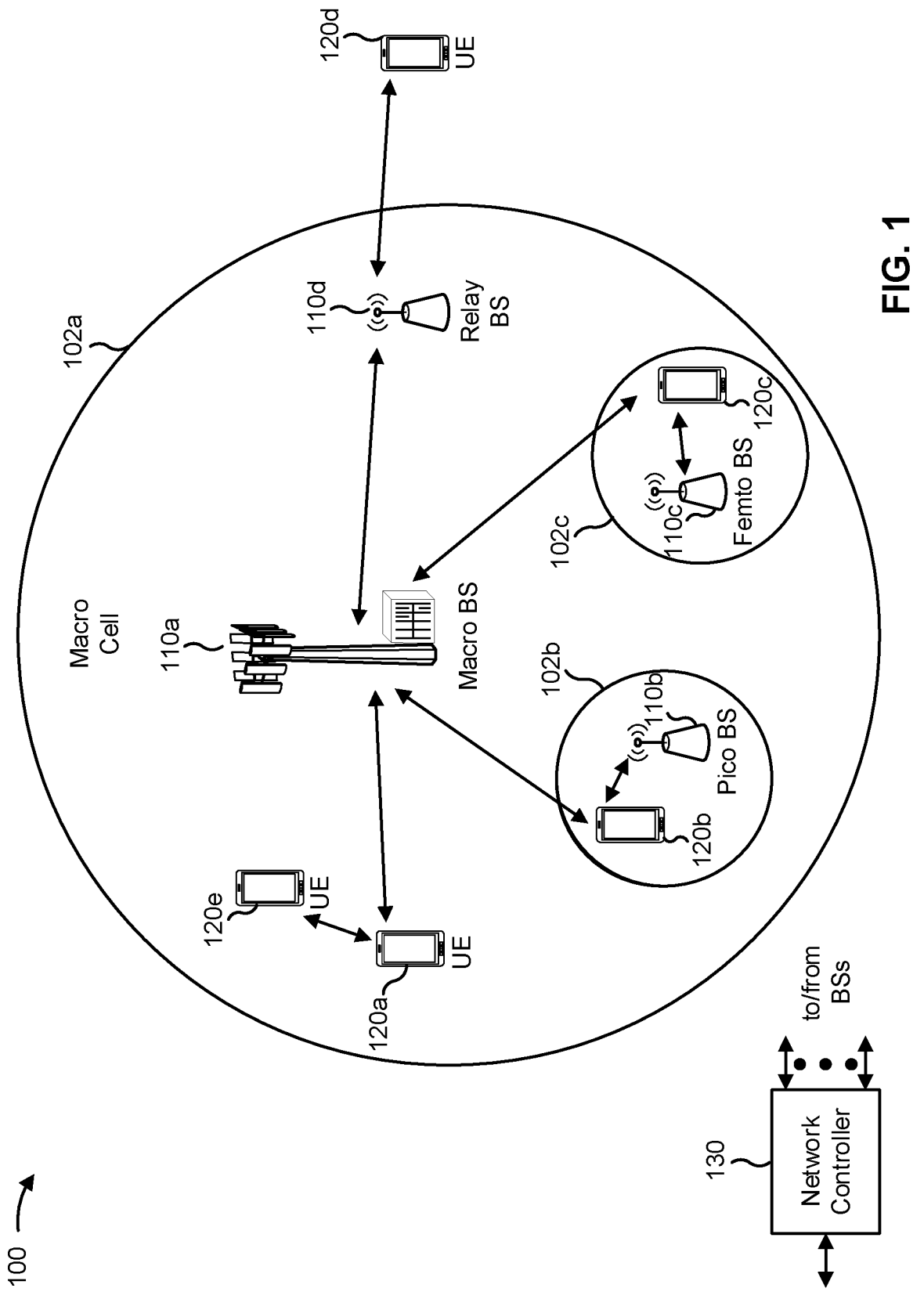
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or a vehicle-to-pedestrian (V2P) protocol, among other examples), and/or a mesh network, among other examples. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
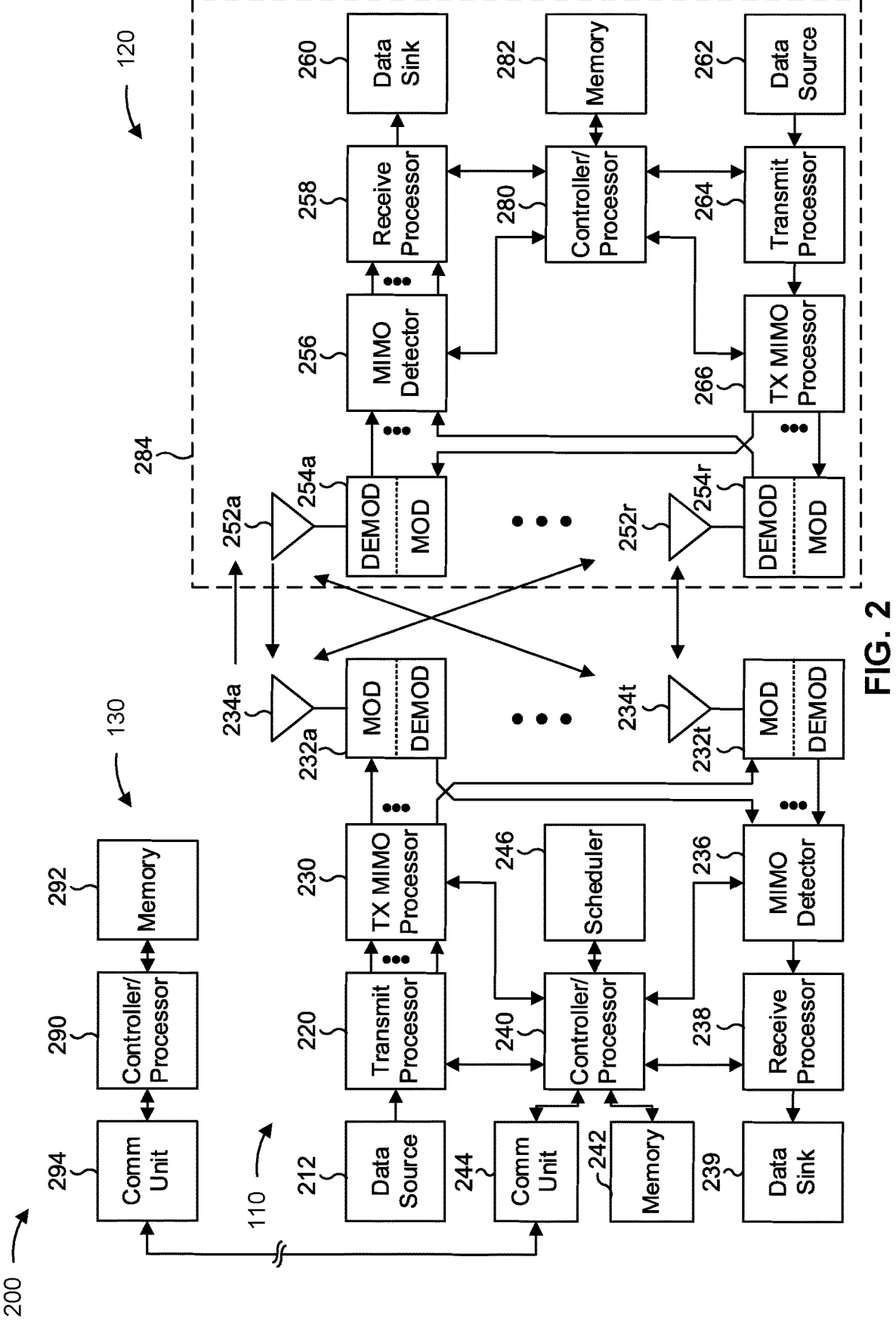
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6A-6B, FIG. 7, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6A-6B, FIG. 7, and/or FIG. 8).

Controller/processor 240 of base station 110, controller/processor 280 of UE 120, and/or any other component(s) of FIG. 2 may perform one or more techniques associated with concurrent sidelink and downlink reception for a multi-TRP (mTRP) UE, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for transmitting, to the base station 110, information related to a concurrent reception capability using different receive beams; means for receiving, from the base station 110, information indicating one or more slots in which concurrent sidelink and downlink reception is enabled based at least in part on the information related to the concurrent reception capability; and/or means for receiving, in the one or more slots in which concurrent sidelink and downlink reception is enabled, a downlink transmission from the base station 110 using a first receive beam and a sidelink transmission from a peer UE 120 using a second receive beam. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for determining one or more RSRP measurements associated with the first receive beam and the second receive beam; means for determining a spatial separation between the first receive beam and the second receive beam; and/or means for detecting the concurrent reception capability based at least in part on the one or more RSRP measurements satisfying a first threshold and the spatial separation satisfying a second threshold.

In some aspects, the UE 120 includes means for determining, at the first receive beam, a measurement of a reference signal received from the peer UE 120 in the one or more slots in which concurrent sidelink and downlink reception is enabled; and/or means for transmitting, to the peer UE 120, information indicating interference caused by the sidelink transmission from the peer UE 120 in the one or more slots in which concurrent sidelink and downlink reception is enabled based at least in part on the measurement of the reference signal at the first receive beam.

In some aspects, the UE 120 includes means for transmitting, to one or more of the peer UE 120 or the base station 110, information indicating a quality of service (QoS) degradation associated with the first receive beam due to the interference caused by the sidelink transmission from the peer UE 120 to trigger reconfiguration of one or more sidelink transmission parameters at the peer UE 120.

In some aspects, the UE 120 includes means for determining, at the second receive beam, a measurement of a reference signal received from the base station 110 in the one or more slots in which concurrent sidelink and downlink reception is enabled; and/or means for transmitting, to the base station 110, information indicating interference caused by the downlink transmission from the base station 110 in the one or more slots in which concurrent sidelink and downlink reception is enabled based at least in part on the measurement of the reference signal at the second receive beam.

In some aspects, the UE 120 includes means for transmitting, to the base station 110, information indicating a QoS degradation associated with the second receive beam due to the interference caused by the downlink transmission from the base station 110 to trigger reconfiguration of one or more downlink transmission parameters at the base station 110.

In some aspects, the UE 120 includes means for receiving, from the base station 110, an indication to use a third receive beam to receive downlink transmissions in the one or more slots in which concurrent sidelink and downlink reception is enabled; and/or means for receiving, from the base station 110, an indication to use a fourth receive beam to receive downlink transmissions in one or more slots in which only downlink reception is enabled, wherein the indication to use the third receive beam and the indication to use the fourth receive beam are based at least in part on interference caused by the sidelink transmission from the peer UE 120 or the downlink transmission from the base station 110.

In some aspects, the base station 110 includes means for receiving, from a first UE 120, information related to a concurrent reception capability using different receive beams; means for transmitting, to the first UE 120, information indicating one or more slots in which concurrent sidelink and downlink reception is enabled based at least in part on the information related to the concurrent reception capability; and/or means for transmitting, in the one or more slots in which concurrent sidelink and downlink reception is enabled, a downlink transmission to the first UE 120 in a first beam direction that differs from a second beam direction associated with a sidelink transmission from a second UE 120 to the first UE 120. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for receiving, from the first UE 120, information indicating a QoS degradation associated with the first beam direction due to interference caused by the sidelink transmission from the second UE 120; and/or means for transmitting, to the second UE 120, information to reconfigure one or more sidelink transmission parameters at the second UE 120 based at least in part on the QoS degradation associated with the first beam direction that is due to the interference caused by the sidelink transmission from the second UE 120.

In some aspects, the base station 110 includes means for transmitting, to the second UE 120, a sidelink grant indicating one or more slots for performing sidelink transmissions to the first UE 120; and/or means for transmitting, to the second UE 120, an indication to reconfigure the one or more sidelink transmission parameters in a subset of the one or more slots for performing sidelink transmissions to the first UE 120.

In some aspects, the base station 110 includes means for receiving, from the first UE 120, information indicating a QoS degradation associated with the first beam direction due to interference caused by the sidelink transmission from the second UE 120; and/or means for reconfiguring one or more downlink transmission parameters based at least in part on the interference caused by the sidelink transmission from the second UE 120.

In some aspects, the base station 110 includes means for receiving, from the first UE 120, information indicating interference caused by the downlink transmission from the base station 110 in the one or more slots in which concurrent sidelink and downlink reception is enabled; and/or means for reconfiguring one or more downlink transmission parameters based at least in part on the interference caused by the downlink transmission from the base station 110.

In some aspects, the base station 110 includes means for receiving, from the first UE 120, information indicating a QoS degradation associated with the second beam direction due to the interference caused by the downlink transmission from the base station 110, wherein the information indicating the QoS degradation associated with the second beam direction triggers reconfiguring the one or more downlink transmission parameters.

In some aspects, the base station 110 includes means for transmitting, to the first UE 120, an indication to use a third beam direction to receive downlink transmissions in the one or more slots in which concurrent sidelink and downlink reception is enabled; and/or or means for transmitting, to the first UE 120, an indication to use a fourth beam direction to receive downlink transmissions in one or more slots in which only downlink reception is enabled, wherein the indication to use the third beam direction and the indication to use the fourth beam direction are based at least in part on interference caused by the sidelink transmission from the second UE 120 or the downlink transmission from the base station 110.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
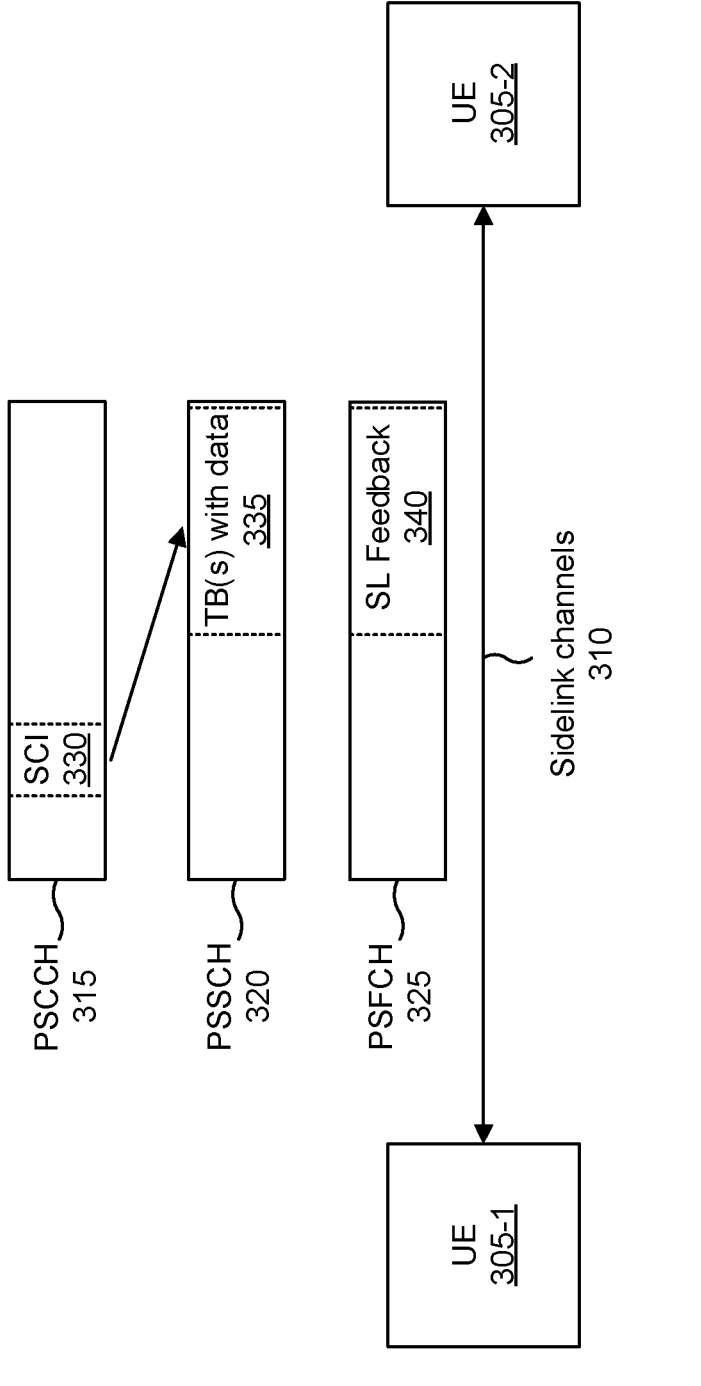
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and/or one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking, among other examples. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 that includes data may be carried on the PSSCH 320. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR), among other examples.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, the UEs 305 may communicate using beams. For example, as used herein, a "beam" or variants thereof may refer to a directional transmission such as a wireless signal that is transmitted in a direction of a receiving device, and a "beam direction" or variants thereof may refer to a direction in which a transmission such as a wireless signal is transmitted towards a receiving device. A beam may include a directional signal, a direction associated with a signal, and/or a set of directional resources associated with a signal (e.g., angle of arrival, horizontal direction, vertical direction). Additionally, or alternatively, a beam may include a set of parameters that indicate one or more characteristics of a directional signal, a direction associated with a signal, and/or a set of directional resources associated with a signal. In some aspects, the UEs 305 may include antenna elements and/or sub-elements that are configured to generate beams (e.g., receive beams and/or transmit beams). For example, antenna elements may be individually selected or deselected for transmission of a signal (or signals) by controlling an amplitude of one or more corresponding amplifiers. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

As indicated above, FIG. 3 is provided as an example. Other examples may differ from what is described with regard to FIG. 3.

Figure 4:
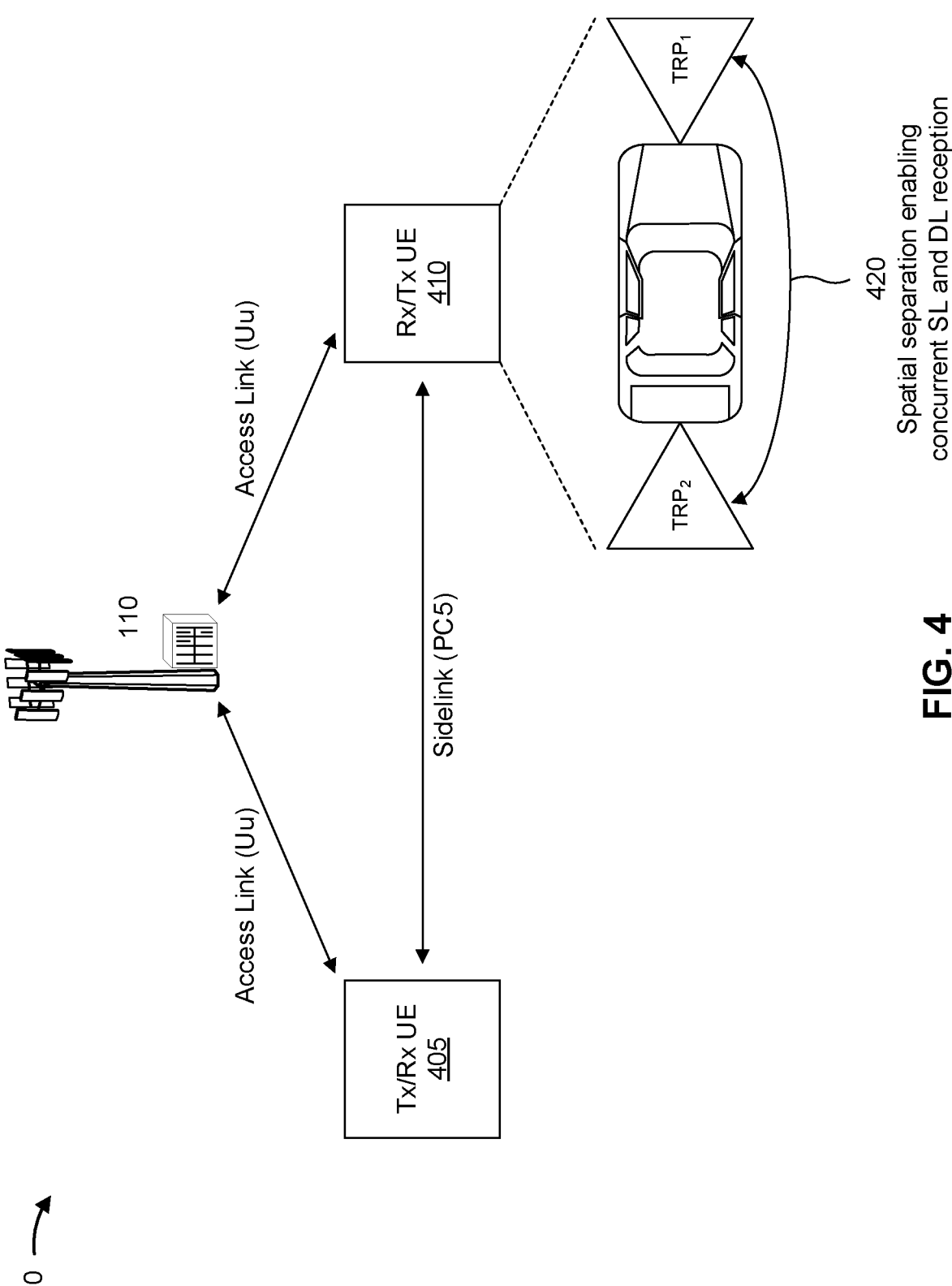
FIG. 4 is a diagram illustrating an example of sidelink communications and access link communications involving at least one UE having multi-transmit receive point (mTRP) capabilities, in accordance with the present disclosure.

FIG. 4 is a diagram illustrating an example 400 of sidelink communications and access link communications involving at least one UE having multi-transmit receive point (mTRP) capabilities, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between Tx/Rx UE 405 and Rx/Tx UE 410 (e.g., via a PC5 interface) may be referred to as a sidelink, and a direct link between the base station 110 and Tx/Rx UE 405 and/or Rx/Tx UE 410 (e.g., via a Uu interface) may be referred to as an access link. Sidelink communications may be transmitted via the sidelink, and access link communications may be transmitted via the access link. An access link communication may be either a downlink transmission (from the base station 110 to Tx/Rx UE 405 or Rx/Tx UE 410) or an uplink transmission (from Tx/RX UE 405 or Rx/Tx UE 410 to the base station 110).

In some aspects, Tx/Rx UE 405 and/or Rx/Tx UE 410 may have mTRP capabilities. For example, as shown in FIG. 4, Rx/Tx UE 410 may include a first TRP (shown as TRP₁) associated with a first antenna panel or antenna array (e.g., a first set of antennas or antenna elements) and a second TRP (shown as TRP₂) associated with a second antenna panel or antenna array (e.g., a second set of antennas or antenna elements). In general, the mTRP capabilities may provide the Rx/Tx UE 410 (or any other UE having mTRP capabilities) with flexibility to provide and/or adapt radio coverage by using different TRPs that are installed or otherwise positioned at different physical locations. For example, in FIG. 4, the Rx/Tx UE 410 with mTRP capabilities is a vehicle UE (V-UE) in which the first TRP and the second TRP are respectively installed at the front of the vehicle and the back of the vehicle (e.g., in contrast to a single TRP V-UE that may have one antenna panel or antenna array mounted on the roof or another central location on the vehicle). Accordingly, in some aspects, the Rx/Tx UE 410 with mTRP capabilities may include a centralized unit that performs baseband processing for each of the multiple TRPs, while RF processing may be performed within or near (e.g., physically or logically) the TRPs.

In existing sidelink communication systems (e.g., NR V2X communication systems associated with 3GPP Release 16 and below), the Tx/Rx UE 405 and the Rx/Tx UE 410 may communicate in a transmission mode where resource selection and/or scheduling is performed by the base station 110, sometimes referred to as mode-1 communications, when the Tx/Rx UE 405 and/or the Rx/Tx UE 410 are under the coverage of the base station 110. For example, the base station 110 may generate sidelink grants and may transmit the sidelink grants to a transmitting UE (e.g., Tx/Rx UE 405) to indicate one or more sidelink transmission parameters to be used for an upcoming sidelink transmission (e.g., one or more resource blocks, one or more slots or subframes, and/or an MCS to be used for the upcoming sidelink transmission). In such cases, the base station 110 may assign orthogonal resource pools (e.g., different time and/or frequency resources) in which the Tx/Rx UE 405 or the Rx/Tx UE 410 can receive either a downlink transmission from the base station 110 or a sidelink transmission from the other UE. However, existing sidelink communication systems generally lack support for enabling a UE to concurrently receive a downlink transmission from the base station and a sidelink transmission from another UE. However, as shown by reference number 420, the Rx/Tx UE 410 with mTRP capabilities may have a sufficient spatial separation between antenna panels or antenna arrays associated with different TRPs, which may enable concurrent sidelink and downlink reception (e.g., using different receive beams). Accordingly, some aspects described herein relate to techniques and apparatuses to enable concurrent sidelink and downlink reception for a UE that has mTRP capabilities.

As indicated above, FIG. 4 is provided as an example. Other examples may differ from what is described with regard to FIG. 4.

Figure 5:
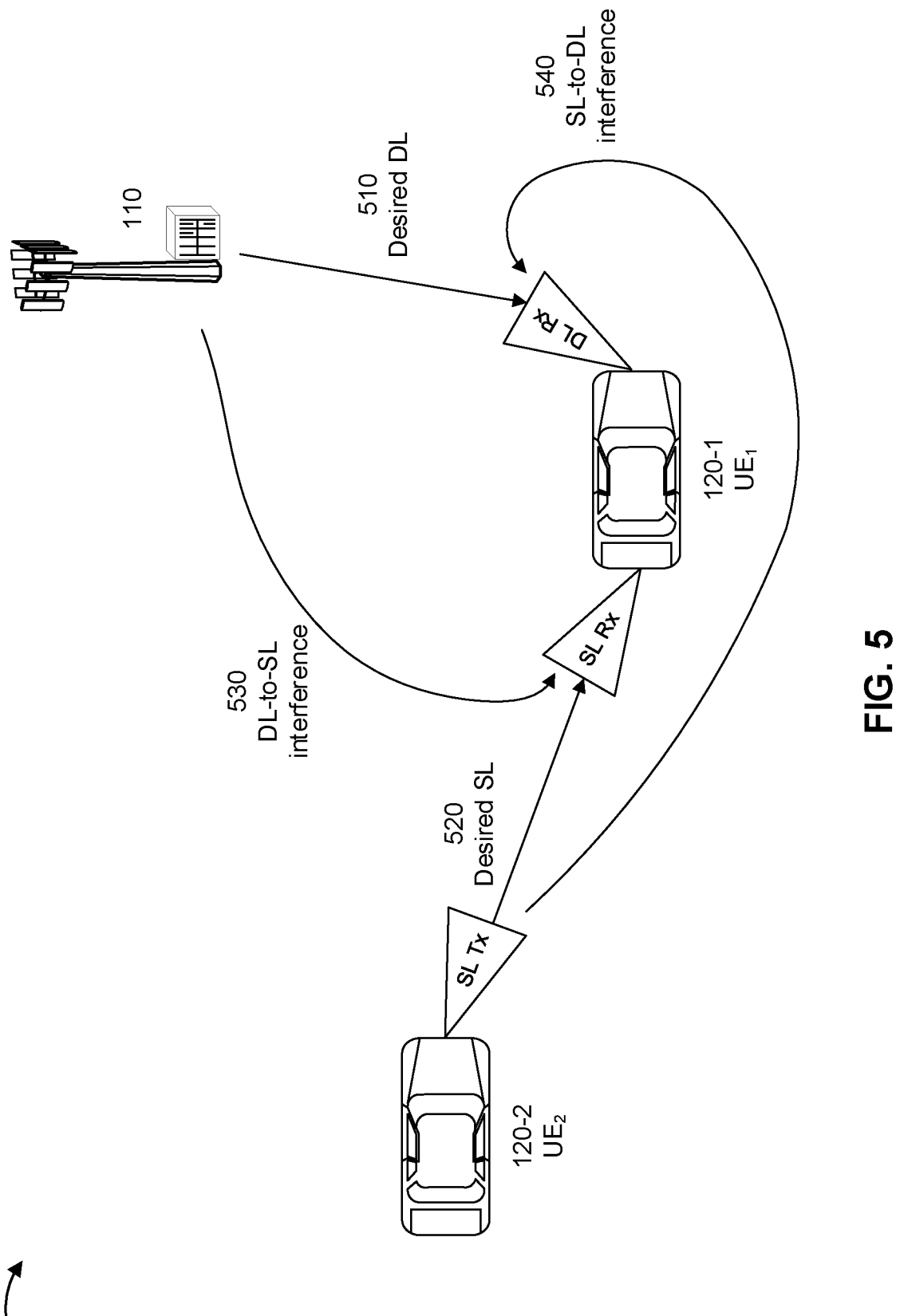
FIG. 5 is a diagram illustrating an example of cross-link interference scenarios that may occur when an mTRP UE concurrently receives sidelink and downlink transmissions, in accordance with the present disclosure.

FIG. 5 is a diagram illustrating an example 500 of cross-link interference scenarios that may occur when an mTRP UE concurrently receives sidelink and downlink transmissions, in accordance with the present disclosure.

As shown in FIG. 5, a first UE 120-1 having mTRP capabilities may be configured to receive downlink transmissions from a base station using a first antenna panel and a first receive beam. As further shown, the first UE 120-1 may be configured to receive sidelink transmissions from a second (peer) UE 120-2 using a second antenna panel and a second receive beam. In some aspects, the first UE 120-1 may concurrently receive one or more downlink transmissions using the first receive beam and one or more sidelink transmissions using the second receive beam when there is sufficient spatial separation between the first antenna panel and the second antenna panel. However, in some circumstances, concurrent downlink and sidelink transmissions in the same transmission time interval (e.g., in the same frame(s), subframe(s), slot(s), mini-slot(s), and/or symbol(s)) may create cross-link interference that degrades reception performance at the first receive beam and/or the second receive beam.

For example, as shown in FIG. 5, when the first UE 120-1 has mTRP capabilities enabling the first UE 120-1 to concurrently receive transmissions at different TRPs using different receive beams, a downlink transmission 510 from the base station 110 to the first UE 120-1 may occur in the same TTI as a sidelink transmission 520 from a second (peer) UE 120-1 to the first UE 120-1. The concurrent transmissions in the same TTI may interfere with one another, which may be referred to as cross-link interference. For example, as shown by reference number 530, the downlink transmission 510 from the base station 110 may be received at the second TRP via the receive beam that is used to receive the sidelink transmission 520 from the peer UE 120-2, whereby the downlink transmission 510 may interfere with reception of the sidelink transmission 520 from the second UE 120-2. This may be referred to as downlink-to-sidelink (DL-to-SL) interference. Further, as shown by reference number 540, the sidelink transmission 520 from the second UE 120-2 may be received at the first TRP via the receive beam that is used to receive the downlink transmission 510 from the base station 110, and may interfere with reception of the downlink transmission 510 from the base station 110. This may be referred to as sidelink-to-downlink (SL-to-DL) interference. In general, the DL-to-SL interference and/or the SL-to-DL interference may occur and/or may increase when there is insufficient spatial separation between the downlink receive beam and the sidelink receive beam, when there is leakage in the wireless environment, and/or based on transmission parameters that are used for the downlink transmission 510 and/or the sidelink transmission 520.

Some aspects described herein relate to techniques and apparatuses to enable concurrent sidelink and downlink reception at an mTRP UE. For example, some aspects described herein relate to signaling mechanisms to enable concurrent downlink and sidelink reception using different receive beams that are associated with one or more transmission configuration indication (TCI) states. Furthermore, as described in further detail herein, some aspects relate to techniques and apparatuses to configure or reconfigure transmission parameters at a base station and/or a peer UE to mitigate DL-to-SL interference and/or SL-to-DL interference experienced at an mTRP UE receiving concurrent downlink and sidelink transmissions from the base station and the peer UE. Furthermore, in cases where the peer UE is under the coverage of the base station, some aspects described herein provide techniques and apparatuses to control sidelink operations associated with the peer UE using access link (Uu) signaling mechanisms. In this way, enabling the UE with mTRP capabilities to concurrently receive downlink and sidelink transmissions may increase scheduling efficiency (e.g., increasing utilization of time and frequency resources), and configuring or reconfiguring transmission parameters to mitigate DL-to-SL and/or SL-to-DL interference may increase reliability of the concurrent downlink and sidelink reception.

As indicated above, FIG. 5 is provided as an example. Other examples may differ from what is described with regard to FIG. 5.

Figure 6A:
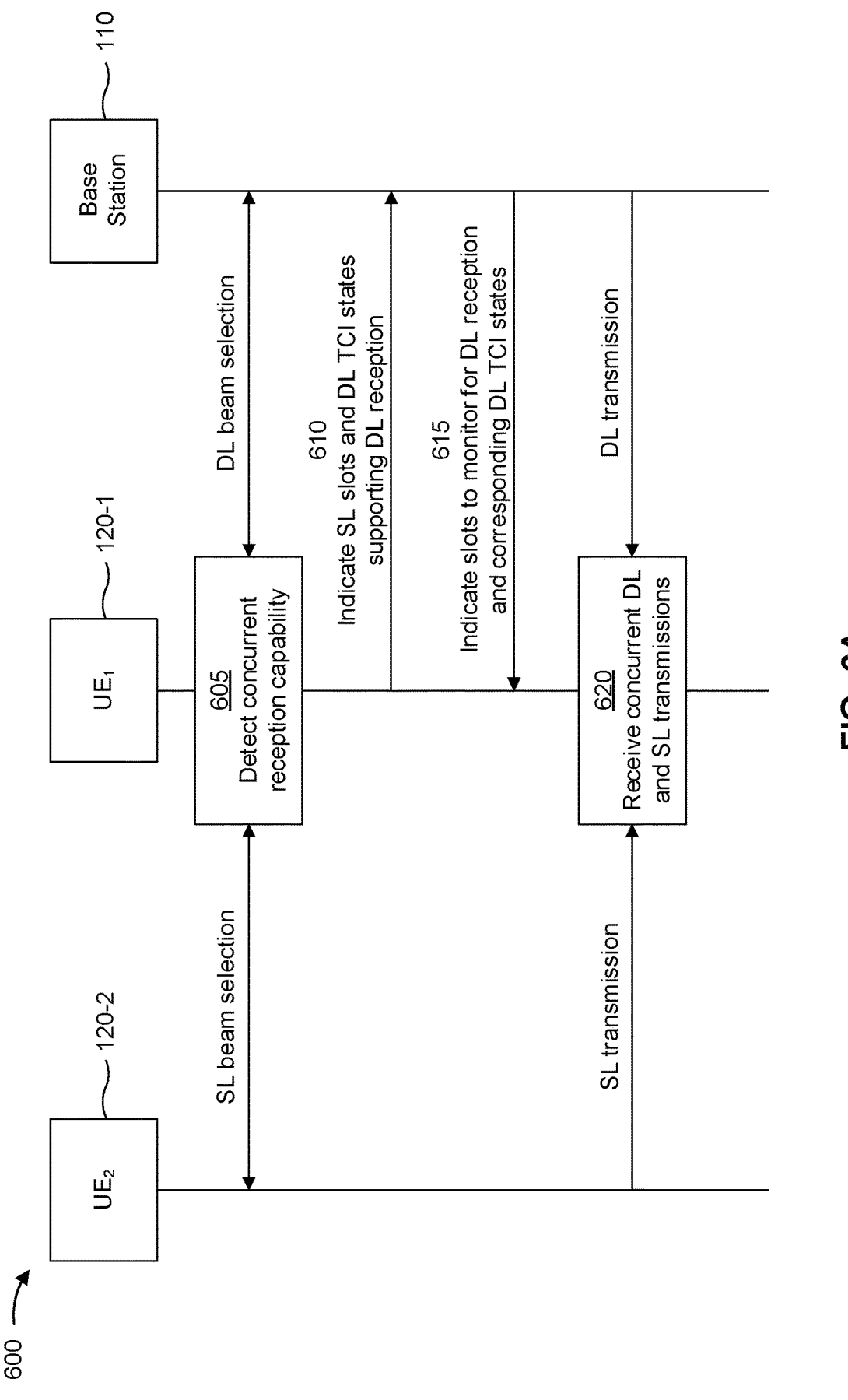
FIGS. 6A-6B are diagrams illustrating examples associated with concurrent sidelink and downlink reception for an mTRP UE, in accordance with the present disclosure.
Figure 6B:
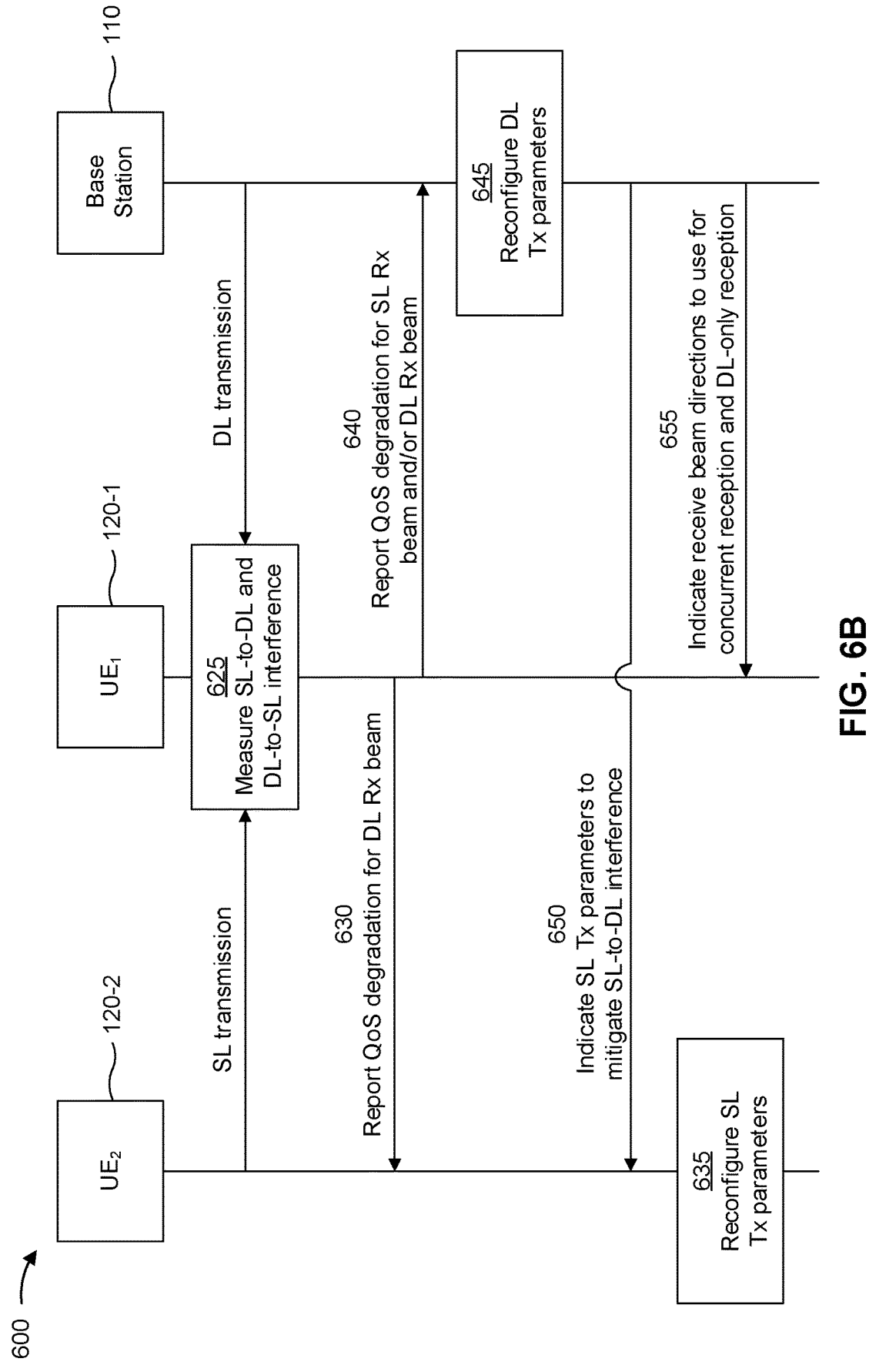

FIGS. 6A-6B are diagrams illustrating examples 600 associated with concurrent sidelink and downlink reception for an mTRP UE, in accordance with the present disclosure. As shown in FIGS. 6A-6B, examples 600 include communication between a base station 110 and a first UE 120-1 that has mTRP capabilities and communication between the first UE 120-1 and a second UE 120-2. In some aspects, the base station 110 and the UEs 120-1, 120-2 may be included in a wireless network, such as wireless network 100. As described herein, the base station 110 and the first UE 120-1 may communicate via a wireless access link, which may include an uplink and a downlink, and the first UE 120-1 may communicate with the second UE 12-02 via a wireless sidelink. Furthermore, in some aspects, the base station 110 and the second UE 120-2 may communicate via a wireless access link (e.g., when the second UE 120-2 is under the coverage of the base station 110), or there may be no communication between the base station 110 and the second UE 120-2 (e.g., when the second UE 120-2 is outside the coverage area of the base station 110).

As shown in FIG. 6A, and by reference number 605, the first UE 120-1 may detect a concurrent downlink and sidelink reception capability, whereby the first UE 120-1 can concurrently receive a downlink transmission from the base station using a first receive beam and a sidelink transmission from the second UE 120-2 using a second receive beam using one or more TCI states. For example, in some aspects, the first UE 120-1 and the base station 110 may communicate to perform a downlink beam selection procedure to identify one or more candidate beams that are suitable for downlink reception, and the first UE 120-1 may similarly communicate with the second UE 120-2 to perform a sidelink beam selection procedure to identify one or more candidate beams that are suitable for sidelink reception. For example, to enable the first UE 120-1 to perform receive (Rx) beam sweeping, a transmitter (e.g., the base station 110 for downlink beam selection or the second UE 120-2 for sidelink beam selection) may use a transmit beam to transmit (e.g., with repetitions) a reference signal multiple times within the same reference signal resource set so that the first UE 120-1 can sweep through receive beams in multiple transmission instances. For example, if the transmitter has a set of N transmit beams and the first UE 120-1 has a set of M receive beams, the reference signal may be transmitted on each of the N transmit beams M times so that the first UE 120-1 may receive M instances of the reference signal per transmit beam. In other words, for each transmit beam, the first UE 120-1 may perform beam sweeping through the receive beams of the first UE 120-1 such that the first UE 120-1 may measure an RSRP for the reference signal transmitted on different transmit beams using different receive beams. Accordingly, in some aspects, the first UE 120-1 may determine whether concurrent downlink and sidelink reception is feasible using different receive beams based at least in part on the RSRP measurements.

For example, in some aspects, the first UE 120-1 may determine a first receive beam to be used to receive a downlink transmission from the base station 110 independent of determining a second receive beam to be used to receive a sidelink transmission from the second UE 120-2.

In this case, the first receive beam and the second receive beam may be associated with orthogonal time and frequency resources. For example, the first UE 120-1 may determine one or more candidate downlink receive beams that have an RSRP measurement that satisfy a threshold, and the first UE 120-1 may further determine one or more candidate sidelink receive beams that have an RSRP measurement that satisfy the threshold. In some aspects, each candidate downlink receive beam may be suitable for downlink reception and each candidate sidelink receive beam may be suitable for sidelink reception based on the candidate receive beams each having an RSRP measurement that satisfies the threshold.

Accordingly, the first UE 120-1 may determine a spatial separation between the candidate downlink receive beam(s) and the candidate sidelink receive beam(s) to determine whether any candidate downlink receive beam can be paired with a candidate sidelink receive beam for concurrent reception from the base station 110 and the second UE 120-2. For example, in some aspects, the first UE 120-2 may detect a concurrent reception capability using a first receive beam and a second receive beam based on the first receive beam and the second receive beam each having an RSRP measurement that satisfies (e.g., equals or exceeds) a first threshold, and further based on the spatial separation between the first receive beam and the second receive beam satisfying (e.g., equaling or exceeding) a second threshold. Alternatively, in some aspects, the first UE 120-1 may determine whether a first receive beam and a second receive beam can be used for concurrent downlink and sidelink reception based on a joint RSRP measurement on time and/or frequency resources that fully or partially overlap. For example, the first UE 120-1 may determine whether a first receive beam and a second receive beam enable a concurrent reception capability based on the first receive beam and the second receive beam having a joint RSRP measurement (e.g., a sum of a first RSRP measurement of the first receive beam and a second RSRP measurement of the second receive beam) that satisfies a threshold and further based on the first receive beam and the second receive beam having a spatial separation that satisfies a threshold.

As further shown in FIG. 6A, and by reference number 610, the first UE 120-1 may transmit, and the base station 110 may receive, information related to a concurrent reception capability using different receive beams. For example, as described above, the first UE 120-1 may detect the concurrent reception capability based at least in part on determining that RSRP measurements associated with a first receive beam and a second receive beam satisfy a threshold (e.g., independently on orthogonal time and/or frequency resources or jointly on time and/or frequency resources that fully or partially overlap) and further based at least in part on determining that the first receive beam and the second receive beam have a spatial separation that satisfies a threshold. In such cases, the first UE 120-1 may indicate, to the base station 110, one or more slots in which the first UE 120-1 is scheduled to receive a sidelink transmission from the second 120-2 and a subset of the one or more slots that supports downlink reception. For example, in some aspects, the first UE 120-1 may determine the one or more slots in which the first UE 120-1 is to receive sidelink transmissions from the second UE 120-2 or otherwise engage in sidelink communication with the second UE 120-2 based on sidelink control information that indicates scheduling grants associated with unicast sidelink transmissions and/or based on a semi-persistent scheduling configuration associated with sidelink transmissions from the second UE 120-2. In this way, the first UE 120-2 may indicate sidelink scheduling information to the base station 110 to enable the base station 110 to schedule downlink transmissions using time and/or frequency resources that may avoid or mitigate DL-to-SL and/or SL-to-DL interference.

Additionally, or alternatively, the information that the first UE 120-1 transmits to the base station 110 to indicate the concurrent downlink and sidelink reception capability may indicate one or more downlink TCI states that correspond to one or more receive beam directions in which the first UE 120-1 is capable of receiving concurrent downlink and sidelink transmissions. For example, based on the beam direction of the second receive beam used to receive sidelink transmissions from the second UE 120-2, the first UE 120-1 may determine one or more beam directions that have a sufficient spatial separation to avoid or mitigate DL-to-SL and/or SL-to-DL interference. Accordingly, the first UE 120-1 may determine downlink TCI states that correspond to the one or more beam directions that have a sufficient spatial separation to avoid or mitigate DL-to-SL and/or SL-to-DL interference in the slot(s) in which the first UE 120-1 is capable of concurrent downlink and sidelink reception, and may transmit information to the base station 110 to identify the downlink TCI states that can be used for a downlink transmission that is concurrent with a sidelink transmission.

As further shown in FIG. 6A, and by reference number 615, the base station 110 may transmit, and the first UE 120-1 may receive, information indicating one or more slots that the first UE 120-1 is to monitor for downlink transmissions and corresponding downlink TCI states associated with the downlink transmissions in the one or more indicated slots. For example, the base station 110 may determine the one or more slots that the first UE 120-1 is to monitor for downlink transmissions based on the subset of slots that the first UE 120-1 indicated are suitable for concurrent downlink and sidelink reception and any applicable constraints at the base station 110. Furthermore, the base station 110 may determine the downlink TCI states to be used in the one or more indicated slots based on the downlink TCI states corresponding to the receive beam directions that have sufficient spatial separation to enable concurrent downlink and sidelink reception at the first UE 120-1.

Accordingly, as further shown in FIG. 6A, and by reference number 620, the first UE 120-1 may then receive concurrent downlink and sidelink transmissions from the base station 110 and the second UE 120-2. For example, as described herein, the first UE 120-1 may use a first receive beam to receive a downlink transmission from the base station 110 in a first beam direction (e.g., using a particular downlink TCI state), and may use a second receive beam to receive a sidelink transmission from the second UE 120-2 in a second beam direction.

As shown in FIG. 6B, and by reference number 625, the first UE 120-1 may measure SL-to-DL interference and DL-to-SL interference caused by the concurrent downlink and sidelink transmissions. For example, the downlink transmission from the base station 110 may include a first reference signal (e.g., a DMRS), and the sidelink transmission from the second UE 120-2 may include a second reference signal (e.g., a DMRS), whereby the first reference signal and the second reference signal can be used to measure mutual interference (e.g., SL-to-DL interference and DL-to-SL interference) caused by the concurrent downlink and sidelink transmissions. For example, in some aspects, the first UE 120-1 may measure the first reference signal received from the base station 110 at the second receive beam that is used to receive the sidelink transmission from the second UE 120-2 to compute the DL-to-SL interference caused by the downlink transmission. Furthermore, the first UE 120-1 may measure the second reference signal received from the second UE 120-2 at the first receive beam that is used to receive the downlink transmission from the base station 110 to compute the SL-to-DL interference caused by the sidelink transmission in the slot(s) when concurrent downlink and sidelink reception is enabled. Additionally, or alternatively, the first UE 120-1 may determine a quality of service (QoS) degradation associated with the first receive beam caused by the SL-to-DL interference (e.g., an RSRP reduction of the first receive beam caused by the SL-to-DL interference) and/or a QoS degradation associated with the second receive beam that is caused by the DL-to-SL interference (e.g., an RSRP reduction of the second receive beam that is caused by the DL-to-SL interference) in the slot(s) when concurrent downlink and sidelink reception is enabled.

As further shown in FIG. 6B, and by reference number 630, the first UE 120-1 may transmit, to the second UE 120-2 via the sidelink, information that indicates the SL-to-DL interference caused by the sidelink transmission and/or the QoS degradation associated with the first receive beam that is caused by the SL-to-DL interference. Accordingly, as further shown in FIG. 6B, and by reference number 635, the second UE 120-2 may reconfigure one or more sidelink transmission parameters to mitigate the SL-to-DL interference based at least in part on the SL-to-DL interference satisfying a threshold. For example, in some aspects, the second UE 120-2 may adjust (e.g., reduce) a transmit power, reconfigure an MCS, and/or modify other suitable transmission parameters to reduce or eliminate the SL-to-DL interference. Additionally, or alternatively, the first UE 120-1 may report the QoS degradation (e.g., the RSRP reduction) associated with the first receive beam to trigger the second UE 120-2 to reconfigure the one or more sidelink transmission parameters.

As further shown in FIG. 6B, and by reference number 640, the first UE 120-1 may transmit, to the base station 110 via the access link, information that indicates the SL-to-DL interference caused by the sidelink transmission, the QoS degradation associated with the first receive beam that is caused by the SL-to-DL interference, the DL-to-SL interference caused by the downlink transmission, and/or the QoS degradation associated with the second receive beam that is caused by the DL-to-SL interference. Accordingly, as further shown in FIG. 6B, and by reference number 645, the base station 110 may reconfigure one or more downlink transmission parameters to overcome the SL-to-DL interference and/or to mitigate the DL-to-SL interference (e.g., based at least in part on the DL-to-SL interference satisfying a threshold). For example, in some aspects, the base station 110 increase an energy per resource element (EPRE) to increase a transmit power and/or adjust an MCS used on a downlink to compensate for the SL-to-DL interference. Additionally, or alternatively, the base station 110 may adjust (e.g., reduce) a transmit power, reconfigure an MCS, and/or modify other suitable downlink transmission parameters to reduce or eliminate the DL-to-SL interference based at least in part on the DL-to-SL interference satisfying a threshold. Additionally, or alternatively, the first UE 120-1 may report the QoS degradation (e.g., the RSRP reduction) associated with the second receive beam to trigger the base station 110 to reconfigure the one or more downlink transmission parameters (e.g., reduce the transmit power of the base station 110) to reduce the DL-to-SL interference.

As further shown in FIG. 6B, and by reference number 650, the base station 110 may transmit, to the second UE 120-2, information to indicate one or more sidelink transmission parameters to mitigate SL-to-DL interference caused by the second UE 120-2 and/or a degraded QoS at the first receive beam that is caused by the SL-to-DL interference. For example, in cases where the second UE 120-2 is under the coverage of the base station 110, the first UE 120-1 may provide a source identifier associated with the second UE 120-2 to the base station 110. In this way, the base station 110 may use the source identifier associated with the second UE 120-2 to configure sidelink transmission parameters associated with the second UE 120-2, such as a sidelink transmit power and/or MCS, among other examples. For example, in some aspects, the first UE 120-1 may report the QoS degradation associated with the first receive beam (used for downlink reception) that is caused by the SL-to-DL interference (e.g., an RSRP reduction of the first receive beam that is caused by the SL-to-DL interference), and may use the QoS degradation information to determine the sidelink transmission parameter(s) to mitigate SL-to-DL interference caused by the second UE 120-2.

For example, in some aspects, the base station 110 may indicate the one or more sidelink transmission parameters to the second UE 120-2 in association with a sidelink grant. For example, the base station 110 may transmit a sidelink grant to the second UE 120-2 to schedule a sidelink transmission from the second UE 120-2 to the first UE 120-1. Furthermore, the base station 110 may transmit configuration information to the second UE 120-2 (e.g., together with or separate from the sidelink grant) to indicate the sidelink transmission parameters that the second UE 120-2 is to apply for the sidelink transmission. For example, the configuration information may indicate that the second UE 120-2 is to apply a different transmit power control (TPC) command (e.g., a transmit power up or transmit power down command) for a subset of the sidelink grant. For example, in some aspects, the subset of the sidelink grant in which the sidelink transmission parameters are to be applied by the second UE 120-2 may include one or more slots in which the first UE 120-1 is scheduled to receive a downlink transmission from the base station 110. For example, the sidelink grant may include a configured grant with a 100 millisecond (ms) periodicity, and the configuration information associated with the sidelink grant may indicate that the second UE 120-2 is to apply a transmit power backoff in each slot when the base station 110 performs a downlink transmission to the first UE 120-1 while allowing the second UE 120-2 to use a maximum transmit power in other slots when there is no downlink transmission scheduled from the base station 110 to the first UE 120-1.

As further shown in FIG. 6B, and by reference number 655, the base station 110 may transmit, and the first UE 120-1 may receive, information indicating one or more different receive beam directions to use receive downlink transmissions from the base station 110 to mitigate the SL-to-DL interference and/or the DL-to-SL interference. For example, in some aspects, the base station 110 may indicate that the first UE 120-1 is to use a third receive beam associated with a third beam direction (different from the first receive beam experiencing SL-to-DL interference and/or causing DL-to-SL interference and the second receive beam used for sidelink reception) to receive downlink transmissions in slots where the first UE 120-1 is receiving concurrent downlink and sidelink transmissions. Furthermore, in some aspects, the base station 110 may indicate that the first UE 120-1 is to use a fourth receive beam associated with a fourth beam direction to receive downlink transmissions during slots in which only downlink reception is scheduled (e.g., when there is no possibility of SL-to-DL interference and DL-to-SL interference because there are no concurrent transmissions).

As indicated above, FIGS. 6A-6B are provided as examples. Other examples may differ from what is described with regard to FIGS. 6A-6B.

FIG. 7 is a diagram illustrating an example process 700 performed, for example, by a UE, in accordance with the present disclosure. Example process 700 is an example where the UE (e.g., UE 120, UE 305, Tx/Rx UE 405, and/or Rx/Tx UE 410, among other examples) has mTRP capabilities and performs operations associated with concurrent sidelink and downlink reception.

As shown in FIG. 7, in some aspects, process 700 may include transmitting, to a base station, information related to a concurrent reception capability using different receive beams (block 710). For example, the UE (e.g., using transmission component 904, depicted in FIG. 9) may transmit, to a base station, information related to a concurrent reception capability using different receive beams, as described above.

As further shown in FIG. 7, in some aspects, process 700 may include receiving, from the base station, information indicating one or more slots in which concurrent sidelink and downlink reception is enabled based at least in part on the information related to the concurrent reception capability (block 720). For example, the UE (e.g., using reception component 902, depicted in FIG. 9) may receive, from the base station, information indicating one or more slots in which concurrent sidelink and downlink reception is enabled based at least in part on the information related to the concurrent reception capability, as described above.

As further shown in FIG. 7, in some aspects, process 700 may include receiving, in the one or more slots in which concurrent sidelink and downlink reception is enabled, a downlink transmission from the base station using a first receive beam and a sidelink transmission from a peer UE using a second receive beam (block 730). For example, the UE (e.g., using reception component 902, depicted in FIG. 9) may receive, in the one or more slots in which concurrent sidelink and downlink reception is enabled, a downlink transmission from the base station using a first receive beam and a sidelink transmission from a peer UE using a second receive beam, as described above.

Process 700 may include additional aspects, such as any single aspect or any combination of aspects described below and/or in connection with one or more other processes described elsewhere herein.

In a first aspect, process 700 includes determining one or more RSRP measurements associated with the first receive beam and the second receive beam, determining a spatial separation between the first receive beam and the second receive beam, and detecting the concurrent reception capability based at least in part on the one or more RSRP measurements satisfying a first threshold and the spatial separation satisfying a second threshold.

In a second aspect, alone or in combination with the first aspect, the one or more RSRP measurements include a first RSRP measurement on one or more time and frequency resources associated with the first receive beam and a second RSRP measurement on one or more time and frequency resources associated with the second receive beam that are orthogonal to the one or more time and frequency resources associated with the first receive beam.

In a third aspect, alone or in combination with one or more of the first and second aspects, the one or more RSRP measurements include a joint RSRP measurement on one or more time and frequency resources associated with the first receive beam that at least partially overlap with one or more time and frequency resources associated with the second receive beam.

In a fourth aspect, alone or in combination with one or more of the first through third aspects, the information related to the concurrent reception capability indicates a subset of one or more slots associated with sidelink communication that supports downlink reception.

In a fifth aspect, alone or in combination with one or more of the first through fourth aspects, the information related to the concurrent reception capability further indicates one or more downlink TCI states that support downlink reception in the subset of the one or more slots.

In a sixth aspect, alone or in combination with one or more of the first through fifth aspects, process 700 includes determining, at the first receive beam, a measurement of a reference signal received from the peer UE in the one or more slots in which concurrent sidelink and downlink reception is enabled, and transmitting, to the peer UE, information indicating interference caused by the sidelink transmission from the peer UE in the one or more slots in which concurrent sidelink and downlink reception is enabled based at least in part on the measurement of the reference signal at the first receive beam.

In a seventh aspect, alone or in combination with one or more of the first through sixth aspects, process 700 includes transmitting, to one or more of the peer UE or the base station, information indicating a QoS degradation associated with the first receive beam due to the interference caused by the sidelink transmission from the peer UE to trigger reconfiguration of one or more sidelink transmission parameters at the peer UE.

In an eighth aspect, alone or in combination with one or more of the first through seventh aspects, process 700 includes determining, at the second receive beam, a measurement of a reference signal received from the base station in the one or more slots in which concurrent sidelink and downlink reception is enabled, and transmitting, to the base station, information indicating interference caused by the downlink transmission from the base station in the one or more slots in which concurrent sidelink and downlink reception is enabled based at least in part on the measurement of the reference signal at the second receive beam.

In a ninth aspect, alone or in combination with one or more of the first through eighth aspects, process 700 includes transmitting, to the base station, information indicating a QoS degradation associated with the second receive beam due to the interference caused by the downlink transmission from the base station to trigger reconfiguration of one or more downlink transmission parameters at the base station.

In a tenth aspect, alone or in combination with one or more of the first through ninth aspects, process 700 includes receiving, from the base station, an indication to use a third receive beam to receive downlink transmissions in the one or more slots in which concurrent sidelink and downlink reception is enabled, and receiving, from the base station, an indication to use a fourth receive beam to receive downlink transmissions in one or more slots in which only downlink reception is enabled, wherein the indication to use the third receive beam and the indication to use the fourth receive beam are based at least in part on interference caused by the sidelink transmission from the peer UE or the downlink transmission from the base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with concurrent sidelink and downlink reception for an mTRP UE.

As shown in FIG. 8, in some aspects, process 800 may include receiving, from a first UE, information related to a concurrent reception capability using different receive beams (block 810). For example, the base station (e.g., using reception component 1002, depicted in FIG. 10) may receive, from a first UE, information related to a concurrent reception capability using different receive beams, as described above.

As further shown in FIG. 8, in some aspects, process 800 may include transmitting, to the first UE, information indicating one or more slots in which concurrent sidelink and downlink reception is enabled based at least in part on the information related to the concurrent reception capability (block 820). For example, the base station (e.g., using transmission component 1004, depicted in FIG. 10) may transmit, to the first UE, information indicating one or more slots in which concurrent sidelink and downlink reception is enabled based at least in part on the information related to the concurrent reception capability, as described above.

As further shown in FIG. 8, in some aspects, process 800 may include transmitting, in the one or more slots in which concurrent sidelink and downlink reception is enabled, a downlink transmission to the first UE in a first beam direction that differs from a second beam direction associated with a sidelink transmission from a second UE to the first UE (block 830). For example, the base station (e.g., using transmission component 1004, depicted in FIG. 10) may transmit, in the one or more slots in which concurrent sidelink and downlink reception is enabled, a downlink transmission to the first UE in a first beam direction that differs from a second beam direction associated with a sidelink transmission from a second UE to the first UE, as described above.

Process 800 may include additional aspects, such as any single aspect or any combination of aspects described below and/or in connection with one or more other processes described elsewhere herein.

In a first aspect, the information related to the concurrent reception capability indicates a subset of one or more slots associated with sidelink communication that support downlink reception.

In a second aspect, alone or in combination with the first aspect, the information related to the concurrent reception capability further indicates one or more downlink TCI states that support downlink reception in the subset of the one or more slots.

In a third aspect, alone or in combination with one or more of the first and second aspects, process 800 includes receiving, from the first UE, information indicating a QoS degradation associated with the first beam direction due to interference caused by the sidelink transmission from the second UE, and transmitting, to the second UE, information to reconfigure one or more sidelink transmission parameters at the second UE based at least in part on the QoS degradation associated with the first beam direction that is due to the interference caused by the sidelink transmission from the second UE.

In a fourth aspect, alone or in combination with one or more of the first through third aspects, process 800 includes transmitting, to the second UE, a sidelink grant indicating one or more slots for performing sidelink transmissions to the first UE, and transmitting, to the second UE, an indication to reconfigure the one or more sidelink transmission parameters in a subset of the one or more slots for performing sidelink transmissions to the first UE.

In a fifth aspect, alone or in combination with one or more of the first through fourth aspects, the subset of the one or more slots correspond to one or more slots in which the first UE is scheduled to receive a downlink transmission from the base station.

In a sixth aspect, alone or in combination with one or more of the first through fifth aspects, process 800 includes receiving, from the first UE, information indicating a QoS degradation associated with the first beam direction due to interference caused by the sidelink transmission from the second UE, and reconfiguring one or more downlink transmission parameters based at least in part on the interference caused by the sidelink transmission from the second UE.

In a seventh aspect, alone or in combination with one or more of the first through sixth aspects, process 800 includes receiving, from the first UE, information indicating interference caused by the downlink transmission from the base station in the one or more slots in which concurrent sidelink and downlink reception is enabled, and reconfiguring one or more downlink transmission parameters based at least in part on the interference caused by the downlink transmission from the base station.

In an eighth aspect, alone or in combination with one or more of the first through seventh aspects, process 800 includes receiving, from the first UE, information indicating a QoS degradation associated with the second beam direction due to the interference caused by the downlink transmission from the base station, wherein the information indicating the QoS degradation associated with the second beam direction triggers reconfiguring the one or more downlink transmission parameters.

In a ninth aspect, alone or in combination with one or more of the first through eighth aspects, process 800 includes transmitting, to the first UE, an indication to use a third beam direction to receive downlink transmissions in the one or more slots in which concurrent sidelink and downlink reception is enabled, and transmitting, to the first UE, an indication to use a fourth beam direction to receive downlink transmissions in one or more slots in which only downlink reception is enabled, wherein the indication to use the third beam direction and the indication to use the fourth beam direction are based at least in part on interference caused by the sidelink transmission from the second UE or the downlink transmission from the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
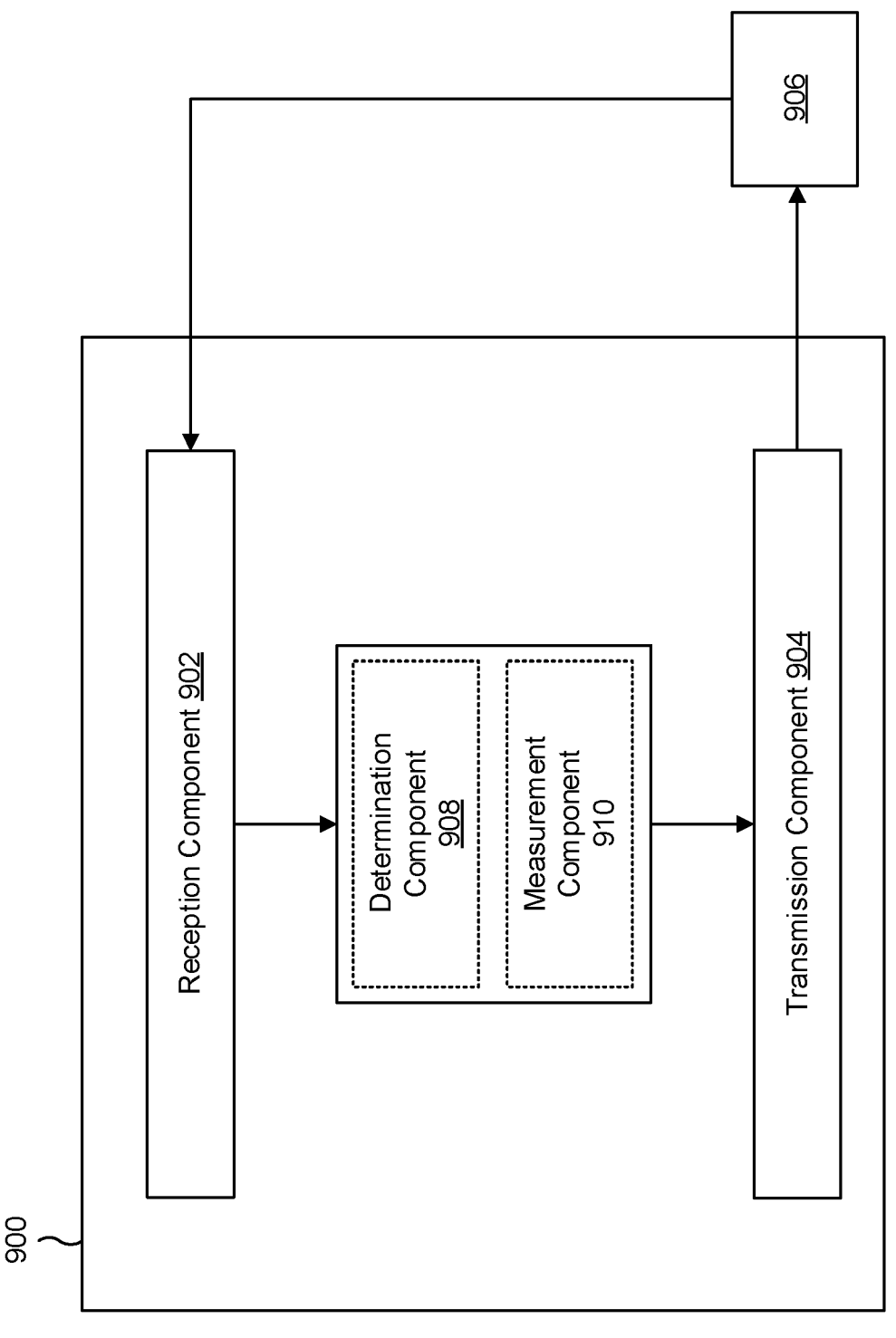
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908 or a measurement component 910, among other examples.

In some aspects, the apparatus 900 may be configured to perform one or more operations described herein in connection with FIGS. 6A-6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit, to a base station, information related to a concurrent reception capability using different receive beams. The reception component 902 may receive, from the base station, information indicating one or more slots in which concurrent sidelink and downlink reception is enabled based at least in part on the information related to the concurrent reception capability. The reception component 902 may receive, in the one or more slots in which concurrent sidelink and downlink reception is enabled, a downlink transmission from the base station using a first receive beam and a sidelink transmission from a peer UE using a second receive beam.

The determination component 908 may determine one or more RSRP measurements associated with the first receive beam and the second receive beam. The determination component 908 may determine a spatial separation between the first receive beam and the second receive beam. The determination component 908 may detect the concurrent reception capability based at least in part on the one or more RSRP measurements satisfying a first threshold and the spatial separation satisfying a second threshold.

The measurement component 910 may determine, at the first receive beam, a measurement of a reference signal received from the peer UE in the one or more slots in which concurrent sidelink and downlink reception is enabled. The transmission component 904 may transmit, to the peer UE, information indicating interference caused by the sidelink transmission from the peer UE in the one or more slots in which concurrent sidelink and downlink reception is enabled based at least in part on the measurement of the reference signal at the first receive beam.

The transmission component 904 may transmit, to one or more of the peer UE or the base station, information indicating a QoS degradation associated with the first receive beam due to the interference caused by the sidelink transmission from the peer UE to trigger reconfiguration of one or more sidelink transmission parameters at the peer UE.

The measurement component 910 may determine, at the second receive beam, a measurement of a reference signal received from the base station in the one or more slots in which concurrent sidelink and downlink reception is enabled. The transmission component 904 may transmit, to the base station, information indicating interference caused by the downlink transmission from the base station in the one or more slots in which concurrent sidelink and downlink reception is enabled based at least in part on the measurement of the reference signal at the second receive beam.

The transmission component 904 may transmit, to the base station, information indicating a QoS degradation associated with the second receive beam due to the interference caused by the downlink transmission from the base station to trigger reconfiguration of one or more downlink transmission parameters at the base station.

The reception component 902 may receive, from the base station, an indication to use a third receive beam to receive downlink transmissions in the one or more slots in which concurrent sidelink and downlink reception is enabled. The reception component 902 may receive, from the base station, an indication to use a fourth receive beam to receive downlink transmissions in one or more slots in which only downlink reception is enabled, wherein the indication to use the third receive beam and the indication to use the fourth receive beam are based at least in part on interference caused by the sidelink transmission from the peer UE or the downlink transmission from the base station.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
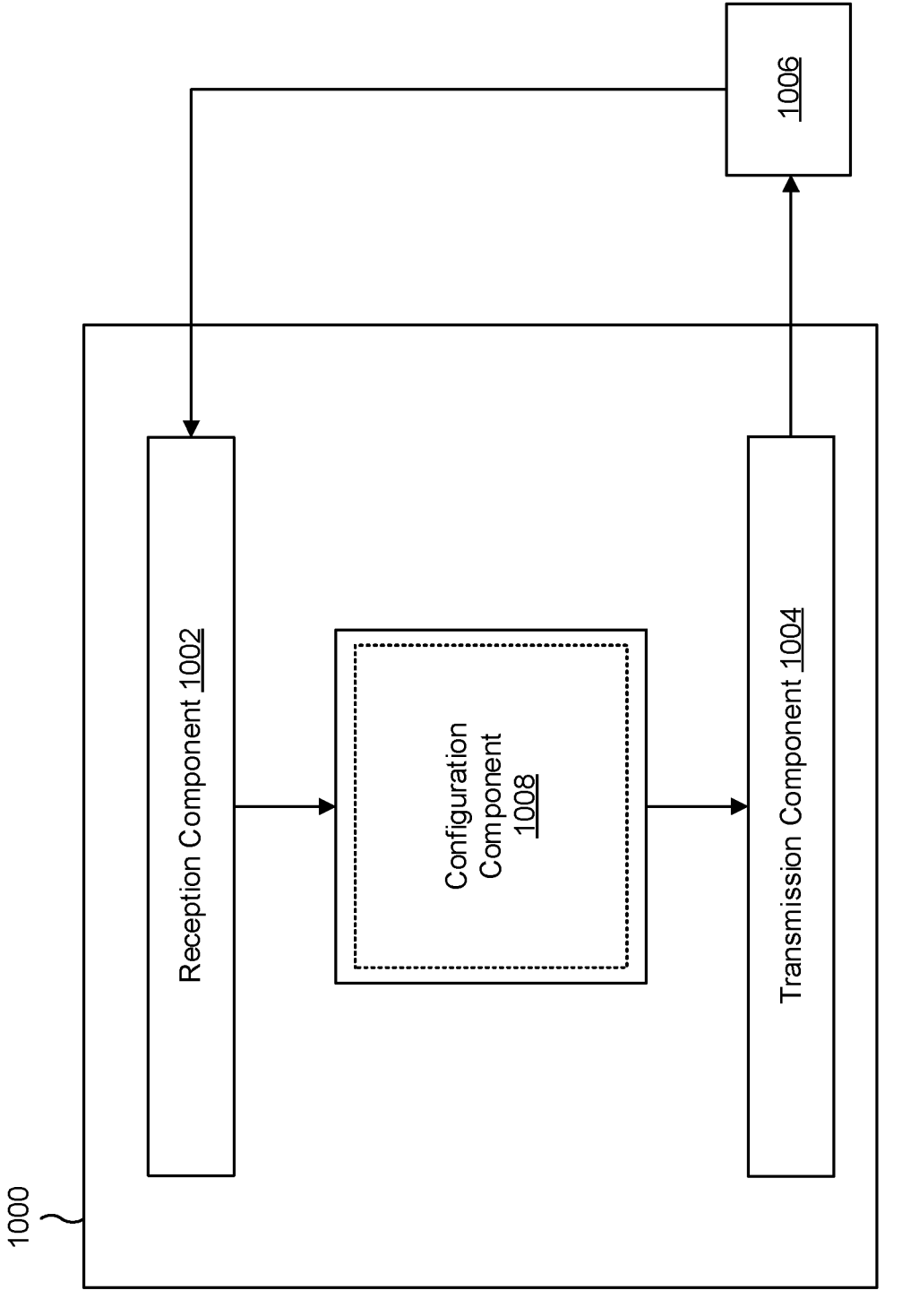

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a configuration component 1008, among other examples.

In some aspects, the apparatus 1000 may be configured to perform one or more operations described herein in connection with FIGS. 6A-6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive, from a first UE, information related to a concurrent reception capability using different receive beams. The transmission component 1004 may transmit, to the first UE, information indicating one or more slots in which concurrent sidelink and downlink reception is enabled based at least in part on the information related to the concurrent reception capability. The transmission component 1004 may transmit, in the one or more slots in which concurrent sidelink and downlink reception is enabled, a downlink transmission to the first UE in a first beam direction that differs from a second beam direction associated with a sidelink transmission from a second UE to the first UE.

The reception component 1002 may receive, from the first UE, information indicating a QoS degradation associated with the first beam direction due to interference caused by the sidelink transmission from the second UE. The transmission component 1004 may transmit, to the second UE, information to reconfigure one or more sidelink transmission parameters at the second UE based at least in part on the QoS degradation associated with the first beam direction that is due to the interference caused by the sidelink transmission from the second UE.

The transmission component 1004 may transmit, to the second UE, a sidelink grant indicating one or more slots for performing sidelink transmissions to the first UE. The transmission component 1004 may transmit, to the second UE, an indication to reconfigure the one or more sidelink transmission parameters in a subset of the one or more slots for performing sidelink transmissions to the first UE.

The reception component 1002 may receive, from the first UE, information indicating a QoS degradation associated with the first beam direction due to interference caused by the sidelink transmission from the second UE. The configuration component 1008 may reconfigure one or more downlink transmission parameters based at least in part on the interference caused by the sidelink transmission from the second UE.

The reception component 1002 may receive, from the first UE, information indicating interference caused by the downlink transmission from the base station in the one or more slots in which concurrent sidelink and downlink reception is enabled. The configuration component 1008 may reconfigure one or more downlink transmission parameters based at least in part on the interference caused by the downlink transmission from the base station.

The reception component 1002 may receive, from the first UE, information indicating a QoS degradation associated with the second beam direction due to the interference caused by the downlink transmission from the base station, wherein the information indicating the QoS degradation associated with the second beam direction triggers reconfiguring the one or more downlink transmission parameters.

The transmission component 1004 may transmit, to the first UE, an indication to use a third beam direction to receive downlink transmissions in the one or more slots in which concurrent sidelink and downlink reception is enabled. The transmission component 1004 may transmit, to the first UE, an indication to use a fourth beam direction to receive downlink transmissions in one or more slots in which only downlink reception is enabled, wherein the indication to use the third beam direction and the indication to use the fourth beam direction are based at least in part on interference caused by the sidelink transmission from the second UE or the downlink transmission from the base station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: transmitting, to a base station, information related to a concurrent reception capability using different receive beams; receiving, from the base station, information indicating one or more slots in which concurrent sidelink and downlink reception is enabled based at least in part on the information related to the concurrent reception capability; and receiving, in the one or more slots in which concurrent sidelink and downlink reception is enabled, a downlink transmission from the base station using a first receive beam and a sidelink transmission from a peer UE using a second receive beam.

Aspect 2: The method of Aspect 1, further comprising: determining one or more RSRP measurements associated with the first receive beam and the second receive beam; determining a spatial separation between the first receive beam and the second receive beam; and detecting the concurrent reception capability based at least in part on the one or more RSRP measurements satisfying a first threshold and the spatial separation satisfying a second threshold.

Aspect 3: The method of Aspect 2, wherein the one or more RSRP measurements include a first RSRP measurement on one or more time and frequency resources associated with the first receive beam and a second RSRP measurement on one or more time and frequency resources associated with the second receive beam that are orthogonal to the one or more time and frequency resources associated with the first receive beam.

Aspect 4: The method of Aspect 2, wherein the one or more RSRP measurements include a joint RSRP measurement on one or more time and frequency resources associated with the first receive beam that at least partially overlap with one or more time and frequency resources associated with the second receive beam.

Aspect 5: The method of any of Aspects 1-4, wherein the information related to the concurrent reception capability indicates a subset of one or more slots associated with sidelink communication that supports downlink reception.

Aspect 6: The method of Aspect 5, wherein the information related to the concurrent reception capability further indicates one or more downlink TCI states that support downlink reception in the subset of the one or more slots.

Aspect 7: The method of any of Aspects 1-6, further comprising: determining, at the first receive beam, a measurement of a reference signal received from the peer UE in the one or more slots in which concurrent sidelink and downlink reception is enabled; and transmitting, to the peer UE, information indicating interference caused by the sidelink transmission from the peer UE in the one or more slots in which concurrent sidelink and downlink reception is enabled based at least in part on the measurement of the reference signal at the first receive beam.

Aspect 8: The method of Aspect 7, further comprising: transmitting, to one or more of the peer UE or the base station, information indicating a QoS degradation associated with the first receive beam due to the interference caused by the sidelink transmission from the peer UE to trigger reconfiguration of one or more sidelink transmission parameters at the peer UE.

Aspect 9: The method of any of Aspects 1-8, further comprising: determining, at the second receive beam, a measurement of a reference signal received from the base station in the one or more slots in which concurrent sidelink and downlink reception is enabled; and transmitting, to the base station, information indicating interference caused by the downlink transmission from the base station in the one or more slots in which concurrent sidelink and downlink reception is enabled based at least in part on the measurement of the reference signal at the second receive beam.

Aspect 10: The method of Aspect 9, further comprising: transmitting, to the base station, information indicating a QoS degradation associated with the second receive beam due to the interference caused by the downlink transmission from the base station to trigger reconfiguration of one or more downlink transmission parameters at the base station.

Aspect 11: The method of any of Aspects 1-10, further comprising: receiving, from the base station, an indication to use a third receive beam to receive downlink transmissions in the one or more slots in which concurrent sidelink and downlink reception is enabled; and receiving, from the base station, an indication to use a fourth receive beam to receive downlink transmissions in one or more slots in which only downlink reception is enabled, wherein the indication to use the third receive beam and the indication to use the fourth receive beam are based at least in part on interference caused by the sidelink transmission from the peer UE or the downlink transmission from the base station.

Aspect 12: A method of wireless communication performed by a base station, comprising: receiving, from a first UE, information related to a concurrent reception capability using different receive beams; transmitting, to the first UE, information indicating one or more slots in which concurrent sidelink and downlink reception is enabled based at least in part on the information related to the concurrent reception capability; and transmitting, in the one or more slots in which concurrent sidelink and downlink reception is enabled, a downlink transmission to the first UE in a first beam direction that differs from a second beam direction associated with a sidelink transmission from a second UE to the first UE.

Aspect 13: The method of Aspect 12, wherein the information related to the concurrent reception capability indicates a subset of one or more slots associated with sidelink communication that support downlink reception.

Aspect 14: The method of Aspect 13, wherein the information related to the concurrent reception capability further indicates one or more downlink TCI states that support downlink reception in the subset of the one or more slots.

Aspect 15: The method of any of Aspects 12-14, further comprising: receiving, from the first UE, information indicating a QoS degradation associated with the first beam direction due to interference caused by the sidelink transmission from the second UE; and transmitting, to the second UE, information to reconfigure one or more sidelink transmission parameters at the second UE based at least in part on the QoS degradation associated with the first beam direction that is due to the interference caused by the sidelink transmission from the second UE.

Aspect 16: The method of Aspect 15, further comprising: transmitting, to the second UE, a sidelink grant indicating one or more slots for performing sidelink transmissions to the first UE; and transmitting, to the second UE, an indication to reconfigure the one or more sidelink transmission parameters in a subset of the one or more slots for performing sidelink transmissions to the first UE.

Aspect 17: The method of Aspect 16, wherein the subset of the one or more slots correspond to one or more slots in which the first UE is scheduled to receive a downlink transmission from the base station.

Aspect 18: The method of any of Aspects 12-17, further comprising: receiving, from the first UE, information indicating a QoS degradation associated with the first beam direction due to interference caused by the sidelink transmission from the second UE; and reconfiguring one or more downlink transmission parameters based at least in part on the interference caused by the sidelink transmission from the second UE.

Aspect 19: The method of any of Aspects 12-18, further comprising: receiving, from the first UE, information indicating interference caused by the downlink transmission from the base station in the one or more slots in which concurrent sidelink and downlink reception is enabled; and reconfiguring one or more downlink transmission parameters based at least in part on the interference caused by the downlink transmission from the base station.

Aspect 20: The method of Aspect 19, further comprising: receiving, from the first UE, information indicating a QoS degradation associated with the second beam direction due to the interference caused by the downlink transmission from the base station, wherein the information indicating the QoS degradation associated with the second beam direction triggers reconfiguring the one or more downlink transmission parameters.

Aspect 21: The method of any of Aspects 12-20, further comprising: transmitting, to the first UE, an indication to use a third beam direction to receive downlink transmissions in the one or more slots in which concurrent sidelink and downlink reception is enabled; and transmitting, to the first UE, an indication to use a fourth beam direction to receive downlink transmissions in one or more slots in which only downlink reception is enabled, wherein the indication to use the third beam direction and the indication to use the fourth beam direction are based at least in part on interference caused by the sidelink transmission from the second UE or the downlink transmission from the base station.

Aspect 22: An apparatus for wireless communication at a device, comprising a processor; memory coupled with the processor; and instructions stored in the memory and executable by the processor to cause the apparatus to perform the method of any of Aspects 1-11.

Aspect 23: A device for wireless communication, comprising a memory and one or more processors coupled to the memory, the memory and the one or more processors configured to perform the method of any of Aspects 1-11.

Aspect 24: An apparatus for wireless communication, comprising at least one means for performing the method of any of Aspects 1-11.

Aspect 25: A non-transitory computer-readable medium storing code for wireless communication, the code comprising instructions executable by a processor to perform the method of any of Aspects 1-11.

Aspect 26: A non-transitory computer-readable medium storing a set of instructions for wireless communication, the set of instructions comprising one or more instructions that, when executed by one or more processors of a device, cause the device to perform the method of any of Aspects 1-11.

Aspect 27: An apparatus for wireless communication at a device, comprising a processor; memory coupled with the processor; and instructions stored in the memory and executable by the processor to cause the apparatus to perform the method of any of Aspects 12-21.

Aspect 28: A device for wireless communication, comprising a memory and one or more processors coupled to the memory, the memory and the one or more processors configured to perform the method of any of Aspects 12-21.

Aspect 29: An apparatus for wireless communication, comprising at least one means for performing the method of any of Aspects 12-21.

Aspect 30: A non-transitory computer-readable medium storing code for wireless communication, the code comprising instructions executable by a processor to perform the method of any of Aspects 12-21.

Aspect 31: A non-transitory computer-readable medium storing a set of instructions for wireless communication, the set of instructions comprising one or more instructions that, when executed by one or more processors of a device, cause the device to perform the method of any of Aspects 12-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting, to a base station, information related to a concurrent reception capability using different receive beams, wherein the information related to the concurrent reception capability indicates a subset of one or more slots associated with sidelink communication that supports downlink reception;
receiving, from the base station, information indicating one or more slots in which concurrent sidelink and downlink reception is enabled based at least in part on the information related to the concurrent reception capability; and
receiving, in the one or more slots in which concurrent sidelink and downlink reception is enabled, a downlink transmission from the base station using a first receive beam and a sidelink transmission from a peer UE using a second receive beam.

2. The method of claim 1, further comprising:
determining one or more reference signal received power (RSRP) measurements associated with the first receive beam and the second receive beam;
determining a spatial separation between the first receive beam and the second receive beam; and
detecting the concurrent reception capability based at least in part on the one or more RSRP measurements satisfying a first threshold and the spatial separation satisfying a second threshold.

3. The method of claim 2,
wherein the one or more RSRP measurements include a
first RSRP measurement on one or more time and
frequency resources associated with the first receive
beam and a second RSRP measurement on one or more
time and frequency resources associated with the sec-
ond receive beam that are orthogonal to the one or more
time and frequency resources associated with the first
receive beam.

4. The method of claim 2,
wherein the one or more RSRP measurements include a
joint RSRP measurement on one or more time and
frequency resources associated with the first receive
beam that at least partially overlap with one or more
time and frequency resources associated with the sec-
ond receive beam.

5. The method of claim 1,
wherein the information related to the concurrent recep-
tion capability further indicates one or more downlink
transmission configuration indication states that sup-
port downlink reception in the subset of the one or more
slots.

6. The method of claim 1, further comprising:
determining, at the first receive beam, a measurement of
a reference signal received from the peer UE in the one
or more slots in which concurrent sidelink and down-
link reception is enabled; and
transmitting, to the peer UE, information indicating inter-
ference caused by the sidelink transmission from the
peer UE in the one or more slots in which concurrent
sidelink and downlink reception is enabled based at
least in part on the measurement of the reference signal
at the first receive beam.

7. The method of claim 6, further comprising:
transmitting, to one or more of the peer UE or the base
station, information indicating a quality of service
(QoS) degradation associated with the first receive
beam due to the interference caused by the sidelink
transmission from the peer UE to trigger reconfigura-
tion of one or more sidelink transmission parameters at
the peer UE.

8. The method of claim 1, further comprising:
determining, at the second receive beam, a measurement
of a reference signal received from the base station in
the one or more slots in which concurrent sidelink and
downlink reception is enabled; and
transmitting, to the base station, information indicating
interference caused by the downlink transmission from
the base station in the one or more slots in which
concurrent sidelink and downlink reception is enabled
based at least in part on the measurement of the
reference signal at the second receive beam.

9. The method of claim 8, further comprising:
transmitting, to the base station, information indicating a
quality of service (QoS) degradation associated with
the second receive beam due to the interference caused
by the downlink transmission from the base station to
trigger reconfiguration of one or more downlink trans-
mission parameters at the base station.

10. The method of claim 1, further comprising:
receiving, from the base station, an indication to use a
third receive beam to receive downlink transmissions in
the one or more slots in which concurrent sidelink and
downlink reception is enabled; and
receiving, from the base station, an indication to use a
fourth receive beam to receive downlink transmissions
in one or more slots in which only downlink reception is enabled, wherein the indication to use the third
receive beam and the indication to use the fourth
receive beam are based at least in part on interference
caused by the sidelink transmission from the peer UE
or the downlink transmission from the base station.

11. A method of wireless communication performed by a
base station, comprising:
receiving, from a first user equipment (UE), information
related to a concurrent reception capability using dif-
ferent receive beams, wherein the information related
to the concurrent reception capability indicates a subset
of one or more slots associated with sidelink commu-
nication that support downlink reception;
transmitting, to the first UE, information indicating one or
more slots in which concurrent sidelink and downlink
reception is enabled based at least in part on the
information related to the concurrent reception capa-
bility; and
transmitting, in the one or more slots in which concurrent
sidelink and downlink reception is enabled, a downlink
transmission to the first UE in a first beam direction that
differs from a second beam direction associated with a
sidelink transmission from a second UE to the first UE.

12. The method of claim 11,
wherein the information related to the concurrent recep-
tion capability further indicates one or more downlink
transmission configuration indication states that sup-
port downlink reception in the subset of the one or more
slots.

13. The method of claim 11, further comprising:
receiving, from the first UE, information indicating a
quality of service (QoS) degradation associated with
the first beam direction due to interference caused by
the sidelink transmission from the second UE; and
transmitting, to the second UE, information to reconfigure
one or more sidelink transmission parameters at the
second UE based at least in part on the QoS degradation
associated with the first beam direction that is due to the
interference caused by the sidelink transmission from
the second UE.

14. The method of claim 13, further comprising:
transmitting, to the second UE, a sidelink grant indicating
one or more slots for performing sidelink transmissions
to the first UE; and
transmitting, to the second UE, an indication to reconfig-
ure the one or more sidelink transmission parameters in
a subset of the one or more slots for performing sidelink
transmissions to the first UE.

15. The method of claim 14,
wherein the subset of the one or more slots correspond to
one or more slots in which the first UE is scheduled to
receive a downlink transmission from the base station.

16. The method of claim 11, further comprising:
receiving, from the first UE, information indicating a
quality of service (QoS) degradation associated with
the first beam direction due to interference caused by
the sidelink transmission from the second UE; and
reconfiguring one or more downlink transmission param-
eters based at least in part on the interference caused by
the sidelink transmission from the second UE.

17. The method of claim 11, further comprising:
receiving, from the first UE, information indicating inter-
ference caused by the downlink transmission from the
base station in the one or more slots in which concur-
rent sidelink and downlink reception is enabled; and reconfiguring one or more downlink transmission parameters based at least in part on the interference caused by the downlink transmission from the base station.

18. The method of claim 17, further comprising:

receiving, from the first UE, information indicating a quality of service (QoS) degradation associated with the second beam direction due to the interference caused by the downlink transmission from the base station, wherein the information indicating the QoS degradation associated with the second beam direction triggers reconfiguring the one or more downlink transmission parameters.

19. The method of claim 11, further comprising:

transmitting, to the first UE, an indication to use a third beam direction to receive downlink transmissions in the one or more slots in which concurrent sidelink and downlink reception is enabled; and transmitting, to the first UE, an indication to use a fourth beam direction to receive downlink transmissions in one or more slots in which only downlink reception is enabled, wherein the indication to use the third beam direction and the indication to use the fourth beam direction are based at least in part on interference caused by the sidelink transmission from the second UE or the downlink transmission from the base station.

20. A user equipment (UE) for wireless communication, comprising:

a memory; and one or more processors, coupled to the memory, configured to:

transmit, to a base station, information related to a concurrent reception capability using different receive beams, wherein the information related to the concurrent reception capability indicates a subset of one or more slots associated with sidelink communication that support downlink reception;

receive, from the base station, information indicating one or more slots in which concurrent sidelink and downlink reception is enabled based at least in part on the information related to the concurrent reception capability; and receive, in the one or more slots in which concurrent sidelink and downlink reception is enabled, a downlink transmission from the base station using a first receive beam and a sidelink transmission from a peer UE using a second receive beam.

21. The UE of claim 20, wherein the one or more processors are further configured to:

determine one or more reference signal received power (RSRP) measurements associated with the first receive beam and the second receive beam;

determine a spatial separation between the first receive beam and the second receive beam; and detect the concurrent reception capability based at least in part on the one or more RSRP measurements satisfying a first threshold and the spatial separation satisfying a second threshold.

22. The UE of claim 20, wherein the one or more processors are further configured to:

determine, at the first receive beam, a measurement of a reference signal received from the peer UE in the one or more slots in which concurrent sidelink and downlink reception is enabled; and transmit, to the peer UE, information indicating interference caused by the sidelink transmission from the peer UE in the one or more slots in which concurrent sidelink and downlink reception is enabled based at least in part on the measurement of the reference signal at the first receive beam.

23. The UE of claim 20, wherein the one or more processors are further configured to:

determine, at the second receive beam, a measurement of a reference signal received from the base station in the one or more slots in which concurrent sidelink and downlink reception is enabled; and transmit, to the base station, information indicating interference caused by the downlink transmission from the base station in the one or more slots in which concurrent sidelink and downlink reception is enabled based at least in part on the measurement of the reference signal at the second receive beam.

24. The UE of claim 20, wherein the information related to the concurrent reception capability further indicates one or more downlink transmission configuration indication states that support downlink reception in the subset of the one or more slots.

25. A base station for wireless communication, comprising:

a memory; and one or more processors, coupled to the memory, configured to:

receive, from a first user equipment (UE), information related to a concurrent reception capability using different receive beams, wherein the information related to the concurrent reception capability indicates a subset of one or more slots associated with sidelink communication that support downlink reception;

transmit, to the first UE, information indicating one or more slots in which concurrent sidelink and downlink reception is enabled based at least in part on the information related to the concurrent reception capability; and transmit, in the one or more slots in which concurrent sidelink and downlink reception is enabled, a downlink transmission to the first UE in a first beam direction that differs from a second beam direction associated with a sidelink transmission from a second UE to the first UE.

26. The base station of claim 25, wherein the one or more processors are further configured to:

receive, from the first UE, information indicating a quality of service (QoS) degradation associated with the first beam direction due to interference caused by the sidelink transmission from the second UE; and transmit, to the second UE, information to reconfigure one or more sidelink transmission parameters at the second UE based at least in part on the QoS degradation associated with the first beam direction that is due to the interference caused by the sidelink transmission from the second UE.

27. The base station of claim 25, wherein the one or more processors are further configured to:

receive, from the first UE, information indicating a quality of service (QoS) degradation associated with the first beam direction due to interference caused by the sidelink transmission from the second UE; and reconfigure one or more downlink transmission param-
eters based at least in part on the interference caused
by the sidelink transmission from the second UE.

28. The base station of claim 25,
wherein the one or more processors are further configured
to:
  receive, from the first UE, information indicating inter-
  ference caused by the downlink transmission from
  the base station in the one or more slots in which
  concurrent sidelink and downlink reception is
  enabled; and
  reconfigure one or more downlink transmission param-
  eters based at least in part on the interference caused
  by the downlink transmission from the base station.

29. The base station of claim 28,
wherein the one or more processors are further configured
to:
  receive, from the first UE, information indicating a
  quality of service (QoS) degradation associated with
  the second beam direction due to the interference
  caused by the downlink transmission from the base
  station, wherein the information indicating the QoS
  degradation associated with the second beam direc-
  tion triggers reconfiguring the one or more downlink
  transmission parameters.

30. The base station of claim 28,
wherein the information related to the concurrent recep-
tion capability further indicates one or more downlink
transmission configuration indication states that sup-
port downlink reception in the subset of the one or more
slots.

\* \* \* \* \*